US007720960B2

(12) United States Patent
Pruss et al.

(10) Patent No.: US 7,720,960 B2
(45) Date of Patent: May 18, 2010

(54) METHOD AND APPARATUS PROVIDING PREPAID BILLING FOR NETWORK SERVICES USING EXPLICIT SERVICE AUTHORIZATION IN AN ACCESS SERVER

(75) Inventors: Richard Manfred Pruss, San Jose, CA (US); Matthew Lawrence King, Eversley (GB); John Fitzgerald, Slough (GB); Tanja Hess, Hessen (DE); Mark Grayson, Paris (FR); David Hovey, Grasse (FR); Marco Cesare Centemeri, Milan (IT); Amit Phadnis, Karnataka (IN); Navneet Agarwal, Karnataka (IN); Vinodh Kumar Ravindranath, Karnataka (IN); Kotha Subba Rama Chandra Murty, Karnataka (IN); Tirumali Seetharam Ajai, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 182 days.

(21) Appl. No.: 10/382,347

(22) Filed: Mar. 4, 2003

(65) Prior Publication Data
US 2004/0193513 A1 Sep. 30, 2004

(51) Int. Cl.
*G06F 15/173* (2006.01)
*H04M 11/00* (2006.01)

(52) U.S. Cl. .............. 709/224; 709/223; 709/225; 709/226; 455/403; 455/406

(58) Field of Classification Search ......... 709/200, 709/202, 203, 205, 217, 219, 223, 225, 227; 705/412
See application file for complete search history.

(56) References Cited

U.S. PATENT DOCUMENTS 6,373,930 B1 * 4/2002 McConnell et al. .... 379/114.28

| | | |
|---|---|---|
| 6,404,870 B1 | 6/2002 | Kia et al. |
| 7,206,318 B2 * | 4/2007 | Keller ............... 370/433 |
| 2001/0009849 A1 * | 7/2001 | Hanson ............. 455/408 |

(Continued)

FOREIGN PATENT DOCUMENTS

WO WO9856160 * 12/1998

OTHER PUBLICATIONS

Portable Computer and Communications Association, Newsletter, Dec. 20, 2001, vol. 6, No. 4 pp. 1-10.*
Light Reading, News Wire Feed, Apr. 9, 2002, p. 1.*
Canadian Intellectual Property Office, Canadian Application No. 2,517,210, Examination Report, dated Feb. 4, 2009.
Current Claims, Canadian Application No. 2,517,210, as of Feb. 4, 2009.

*Primary Examiner*—Hassan Phillips
(74) *Attorney, Agent, or Firm*—Hickman Palermo Troung & Becker LLP

(57) ABSTRACT

A method is disclosed for authorizing a prepaid network service in a data network. A network end station issues a request for a prepaid network service. At a network node, such as a router serving as a gateway for selecting services, a determination is made about whether a user associated with the end station is authorized to access the prepaid network service. Network traffic from the end station is forwarded to a service provider only when the user is authorized to use the prepaid network service. Specific embodiments provide message flows among a mobile station, gateway support node, router, and authentication server that support providing prepaid services in a packet-switched network for mobile communication. In certain embodiments, a connection is held open for an end station while a prepaid quota value is refreshed at a portal, thereby reducing overhead and precluding the need to repeat user logon steps. Further, unused quota amounts can be returned to the authentication server for use in association with multiple concurrent connections of the same device.

30 Claims, 8 Drawing Sheets

U.S. PATENT DOCUMENTS

| | | | |
|---|---|---|---|
| 2001/0050908 A1* | 12/2001 | Verkama | 370/329 |
| 2002/0103762 A1* | 8/2002 | Lopez et al. | 705/63 |
| 2002/0127995 A1* | 9/2002 | Faccinn et al. | 455/406 |
| 2002/0131395 A1* | 9/2002 | Wang | 370/349 |
| 2002/0133457 A1* | 9/2002 | Gerlach et al. | 705/39 |
| 2002/0176378 A1* | 11/2002 | Hamilton et al. | 370/328 |
| 2003/0050041 A1* | 3/2003 | Wu | 455/406 |
| 2003/0087627 A1* | 5/2003 | Cannon | 455/404 |
| 2003/0101135 A1* | 5/2003 | Myatt et al. | 705/40 |
| 2003/0147363 A1* | 8/2003 | Ala-Luukko | 370/328 |
| 2003/0220994 A1* | 11/2003 | Zhu | 709/223 |
| 2004/0019539 A1* | 1/2004 | Raman et al. | 705/29 |
| 2004/0048600 A1* | 3/2004 | Madour et al. | 455/408 |
| 2004/0106393 A1* | 6/2004 | Chowdhury et al. | 455/406 |

* cited by examiner

METHOD AND APPARATUS PROVIDING PREPAID BILLING FOR NETWORK SERVICES USING EXPLICIT SERVICE AUTHORIZATION IN AN ACCESS SERVER

FIELD OF THE INVENTION

The present invention generally relates to network communications equipment and processes. The invention relates more specifically to a method and apparatus providing prepaid billing for network services using explicit service authorization in an access server.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The General Packet Radio System (GPRS) is a new service that provides actual packet radio access for mobile Global System for Mobile Communications (GSM) and time-division multiple access (TDMA) users. The main benefits of GPRS are that it reserves radio resources only when there is data to send and it reduces reliance on traditional circuit-switched network elements.

The increased functionality of GPRS will decrease the incremental cost to provide data services, an occurrence that will, in turn, increase the penetration of data services between consumer and business users. In addition, GPRS will allow improved quality of data services as measured in terms of reliability, response time, and features supported. The unique applications that will be developed with GPRS will appeal to a broad base of mobile subscribers and allow operators to differentiate their services. These new services will increase capacity requirements on the radio and base-station subsystem resources. One method GPRS uses to alleviate the capacity impacts is sharing the same radio resource among all mobile stations in a cell, providing effective use of the scarce resources. In, addition, new core network elements will be deployed to support the high burstiness of data services more efficiently.

In addition to providing new services for today's mobile user, GPRS is important as a migration step toward third-generation (3G) networks. GPRS will allow network operators to implement an IP-based core architecture for data applications, which will continue to be used and expanded upon for 3G services for integrated voice and data applications. In addition, GPRS will prove a testing and development area for new services and applications, which will also be used in the development of 3G services.

To remain competitive in the market for wireless mobile telecommunications and computing services, mobile telecommunications service providers need to be prepared to rapidly launch various value-added services. Unlike past services, emerging services require authentication, authorization and accounting (AAA) capabilities to manage access and usage for services and applications.

For example, to decide whether to offer, authorize or satisfy requests for new services to users who prepay, mobile service providers need to determine, in real time, such data as customer balance and past service usage. Thus, as a specific example, to determine whether to permit a particular user having a prepaid account to access a mobile interactive game service, the service provider must be able to determine, in real time, whether the user's account contains sufficient remaining value to cover the requested service.

In the context of network access, AAA servers based on protocols such as RADIUS and TACACS+ can provide authentication, authorization and accounting services. However, existing AAA servers and related protocols do not provide functions that can support prepaid service offerings, such as account balance determination and account balance reservation.

Mobile service providers also need to perform such AAA functions in coordination with equipment and software that governs network access. For example, in certain mobile networks that use packet-switched data communication protocols, a packet data router is configured as an access controller. When a user contacts the network, the user first reaches the access controller. The access controller authenticates the user by communicating with the AAA server. After authenticating the user, the access controller receives a subscribed service list from the AAA server. The access controller grants access to the network services that are included in the subscribed service list. Routers operating as access controllers also may be termed access servers; however, the term access controller is used in this description to avoid confusion with gateway support nodes, which act as access servers for mobile devices in certain embodiments that are described further below.

An example of an access controller with these capabilities is the 7200 or 7400 with the Service Selection Gateway Cisco IOS feature ("SSG"), from Cisco Systems, Inc., of San Jose, Calif. SSG is a software solution, supported on various hardware platforms, which allows users (subscribers) who use a variety of access technologies such as xDSL, cable, wireless and dial-up to simultaneously access the services provided by different ISPs and corporate L2TP access servers. In one implementation, SSG is a software module in a router, which connects to the subscriber's network, service management network and service providers' network. SSG is responsible for regulating service selection and directing traffic for the subscribers.

In current access controllers, each user is implicitly authorized to use a service by the presence of that service in the subscribed service list provided during user authentication. This approach is inadequate for supporting prepaid service offerings of mobile service providers. In particular, there is a need to perform operations such as checking account balances before granting access to selected services. There is also a need for a way to disable access to a service when the prepaid time or value for that service is exhausted. Thus, there is a need to provide some form of explicit service authorization as part of the user authentication process and dynamic service re-authorization following consumption of a reserved balance.

Users of prepaid mobile services, and the providers of these services, also desire to have other functions available in a mobile handset or terminal. For example, there is a need for service providers to offer real-time billing per service. Users wish to have online display of prepaid balances and online refilling of credit balances. Users and service providers wish to have the ability for users to concurrently access multiple services, and to sequentially access different services without re-authentication. Users and service providers also desire to have support for micro payment transactions.

Based on the foregoing, there is a clear need for an improved way to use existing AAA services to support prepaid service offerings of mobile service providers.

There is a specific need for a way to support real-time billing per service, online balance display and refilling, concurrent and sequential access, and micro payments.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
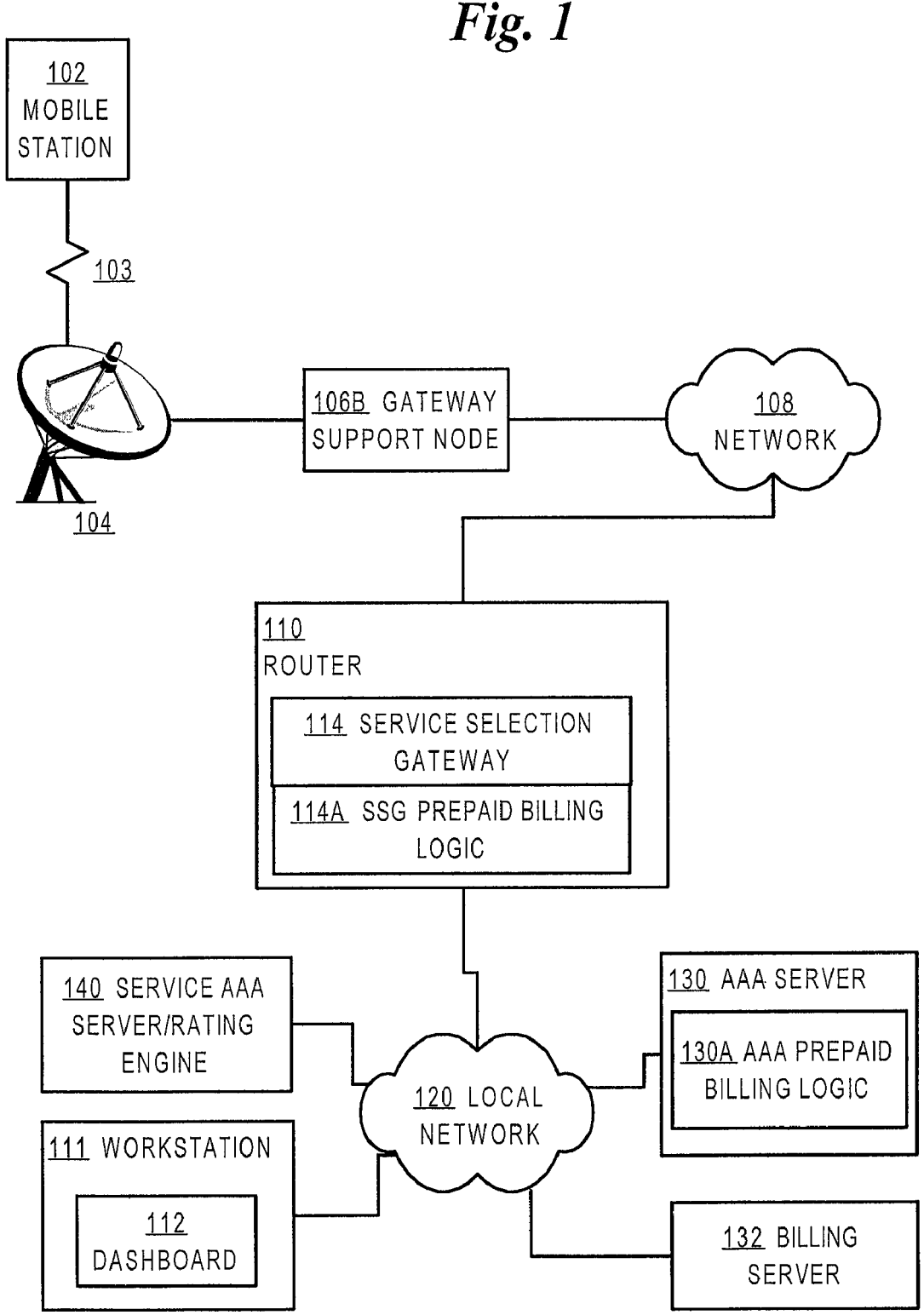
FIG. 1 is a block diagram of an example hypothetical network arrangement in which an embodiment may be used.

A method and apparatus providing prepaid billing for network services using explicit service authorization and subsequent re-authorization in an access server is described.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
  2.0 Structural and Functional Overview
    2.1 Terminology
    2.2 Structural Overview
    2.3 Functional Overview
  3.0 Prepaid Billing Support Using Explicit Service Authorization
    3.1 Message Flow
    3.2 Quota Allotment Approaches
      3.2.1 Fragmented Quota Allotment
      3.2.2 Quota Re-Distribution Approach with Idle Timeout
    3.3 Refilling Quotas
    3.4 Summary of Beneficial Features of Certain Embodiments
  4.0 Implementation Mechanisms—Hardware Overview
  5.0 Extensions and Alternatives 1.0 General Overview The needs identified in the foregoing Background, and other needs and objects that will become apparent for the following description, are achieved in the present invention, which comprises, in one aspect, a method for authorizing a prepaid mobile network service in a data network. A mobile station issues a request for a prepaid network service. At a network node, such as a router serving as a gateway for selecting mobile services, a determination is made about whether a mobile user associated with the mobile station is authorized to access the prepaid network service. Network traffic from the mobile station is forwarded to a service provider only when the mobile user is authorized to use the prepaid network service, or when the service is provided from a default network area ("open garden") and therefore free of charge.

Specific embodiments provide message flows among a mobile station, gateway support node, router, and authentication/quota server that support providing prepaid services in a packet-switched network for mobile communication. In certain embodiments, a connection is held open for a mobile station while a prepaid quota value is refreshed at a portal, thereby reducing overhead and precluding the need to repeat user logon steps. Further, unused quota amounts can be returned to the authentication/quota server for use in association with multiple concurrent connections of the same mobile device.

In other aspects, the invention encompasses a computer apparatus and a computer-readable medium configured to carry out the foregoing steps.

While certain embodiments are described herein in the context of access by mobile users and mobile stations, the scope of the invention is not limited to the mobile network context. Alternative embodiments are independent of access technology, and may be used in the context of any other access technology, e.g., Public Wireless LAN (PWLAN), Ethernet-to-the-X (ETTX) networks, Third Generation (3G) networks, and others. Further, certain embodiments are illustrated using RADIUS as a communication protocol, but embodiments are not limited to the use of the RADIUS protocol. Other embodiments may use other AAA protocols, such as Diameter, or other request/response protocols, such as HTTP.

2.0 Structural and Functional Overview

According to one embodiment, authentication, authorization and accounting services are provided in a coordinated manner to result in intelligently managing service usage through an integrated business process. A Service Selection Gateway ("SSG") module, which executes in a network element under control of its operating system, cooperates with a rating and billing manager. The Service Selection Gateway module includes a Service Authorization module that can authenticate the identity of users before a service is delivered, authorize or deny a service according to operator-specified business logic, accurately account for single and simultaneous services once they are used and re-authorize or deny a service according to operator-specified business logic.

Thus, in this arrangement, the Service Selection Gateway acts as a control plane, but prepaid account balances and related control information is external to the network through which the prepaid services are provided. An AAA server cooperates with the Service Selection Gateway to store values representing remaining service value, in terms of time or volume, for which a user is allowed to access a service.

2.1 Terminology

In the following description, certain terms have the definitions set forth below.

| Term | Definition |
|------|------------|
| 3G | Third Generation |
| AA | Access Accept |
| AAA | Authentication, Authorization and Accounting |
| APN | Access Point Name |
| AR | Access Request (or Reject) |
| BSC | Base Station Controller |
| BTS | Base Transceiver Station |
| CHAP | Challenge Handshake Authentication Protocol |
| DHCP | Dynamic Host Configuration Protocol |
| GGSN | Gateway GPRS Support Node |
| GPRS | General Packet Radio System |
| GSM | Global System for Mobile Communications |
| ISP | Internet Service Provider |
| L2TP | Layer 2 Tunneling Protocol |
| NAS | Network Access Server |
| NRP | Node Route Processor |
| PAP | Password Authentication Protocol |
| PDP | Packet Data Protocol |
| PLMN | Public Land Mobile Network |
| POD | Packet Of Death |
| RADIUS | Remote Authentication Dial In User Service |
| SGSN | Serving GPRS Support Node |
| SESM | Subscriber Edge Services Manager |
| SSG | Service Selection Gateway |
| TDMA | Time-Division Multiple Access |
| VSA | Vendor Specific Attribute |

2.2 Structural Overview

FIG. 1 is a block diagram of an example hypothetical network arrangement in which an embodiment may be used. A mobile station 102 (also termed "MS" or "mobile user" herein) associated with a mobile user is communicatively coupled by a wireless link 103 to ground station equipment 104. In certain embodiments, ground station equipment 104 comprises a BTS, BSC, and SGSN.

Voice, data and other signals communicated by mobile station 102 are received from ground station equipment 104 at gateway support nodes (for example, 106B). Gateway support nodes may interface to the public land mobile network (PLMN). In certain embodiments that use GPRS, gateway support node 106B is termed a Gateway GPRS Support Node (GGSN). Node 106B provides an interface to network 108, which is a packet-switched network and may be a wide area network, internetwork, or the global internetwork known as the Internet.

A router 110 is communicatively coupled to network 108. In one embodiment, router 110 is an access router of an Internet service provider (ISP) or business enterprise that has a local network 120. Router 110 may include a service selection gateway (SSG) 114. A workstation 111 on local network 120 may execute a Dashboard 112, which comprises one or more software elements that provide HTML or WML documents or pages, and an associated Web server that can deliver the Web pages to mobile station 102 using Wireless Access Protocol (WAP) or a similar protocol. Dashboard 112 thus provides a graphical facility with which mobile station 102 can select one or more services of the ISP or enterprise. In one embodiment, dashboard 112 is logically located in a default mobile network ("open garden") such that access to it is free of charge for mobile station 102.

An authentication, authorization and accounting (AAA) server 130 is communicatively coupled to local network 120. AAA Server 130 stores user account information and can respond to requests of SSG 114, directly or acting as proxy for GGSN 106B, to authenticate mobile station 102 and determine whether the mobile user is authorized to access local network 120. AAA Server 130 also generates and stores accounting records reflecting usage of local network 120 by mobile station 102, for auditing or generating statements or invoices to the mobile user or associated parties. In one embodiment, AAA server 130 communicates with other network elements using RADIUS messages.

A Billing Server 132, also termed a user balance server, is communicatively coupled to local network 120. Billing server 132 stores prepaid account balances and related information for users of services associated with local network 120. Billing server 132 can store billing information in a relational database, a directory, a RADIUS server, or any other storage device that the Dashboard 112 can query. In certain embodiments, the functions and storage capabilities of Billing Server 132 are integrated into AAA server 130.

A service AAA server/rating engine 140 may be communicatively coupled to local network 120. The service AAA server/rating engine 140 is associated with a particular service; it can determine whether a particular user is authorized to use the particular service, and can generate accounting information with respect to the particular service. In certain embodiments, the functions and storage capabilities of service AAA server/rating engine 140 are integrated into AAA server 130.

SSG 114 of router 110 includes SSG prepaid billing logic 114A, which comprises one or more software elements that cooperate to provide the prepaid billing support functions that are described herein. AAA server 130 includes AAA prepaid billing logic 130A that can interact with SSG prepaid billing logic 114A using messages as described herein to provide the prepaid billing support functions.

For purposes of illustrating a simple example, the elements of FIG. 1 are shown in simplified form. In practical embodiments, there may be any number of mobile stations 102, multiple GGSNs 106B, and multiple sets of router 110, local network 120, AAA server 130, and Billing Server 132 associated with different service providers.

In one specific embodiment, SSG 114 is the Cisco Service Selection Gateway, which is a Cisco IOS® feature software module that enables service providers to enhance the value of existing services and offer new services, hosted on a hardware platform such as the Cisco 6400 broadband access device, or similar hardware. Services such as videoconferencing, streaming video, personalized Internet, business-grade Internet, shopping, mobile banking, location-based services, WAP applications, Short Message System (SMS), and gaming can be selected using the Dashboard 112. In coordination, SSG 114 and Dashboard 112 allow subscribers to dynamically select on-demand services. It then switches subscriber traffic to the selected services, applying full edge routing and quality of service (QoS) policies.

In another embodiment, Dashboard 112 is the Cisco Subscriber Edge Services Manager. With the SSG 114, the Dashboard 112 allows a service provider to create a captive Web portal, whereby subscribers select services using a Web browser in the mobile device. Portals can be branded. There can be multiple portals for different service providers. In one embodiment, the Dashboard 112 is a Java-based application that runs on a Solaris or Windows NT workstation.

In operation, the Dashboard 112 presents mobile station 102 with a menu of services, enabling the mobile user to log on to and disconnect from different services, serially or concurrently, using a Web browser. This feature improves flexibility and convenience for subscribers, and enables service providers to bill subscribers based on connection time and volume of data used, rather than charging a flat rate. For example, Internet access might be a fixed service, but additional on-demand services such as corporate telecommuting, gaming, or other extranet networks allow billing beyond a single service. Since the Dashboard 112 generates HTML or WML pages, no client software is needed at mobile station 102.

For purposes of illustrating a clear example, FIG. 1 illustrates an embodiment in the context of mobile users and mobile stations. However, alternative embodiments may be used in the context of a Public Wireless LAN (PWLAN), Ethernet-to-the-X (ETTX) networks, Third Generation (3G) networks, and others. In these embodiments, mobile station 102 is any network end station, and the functions described herein may be performed by network nodes other than a GGSN.

2.3 Functional Overview

Figure 2:
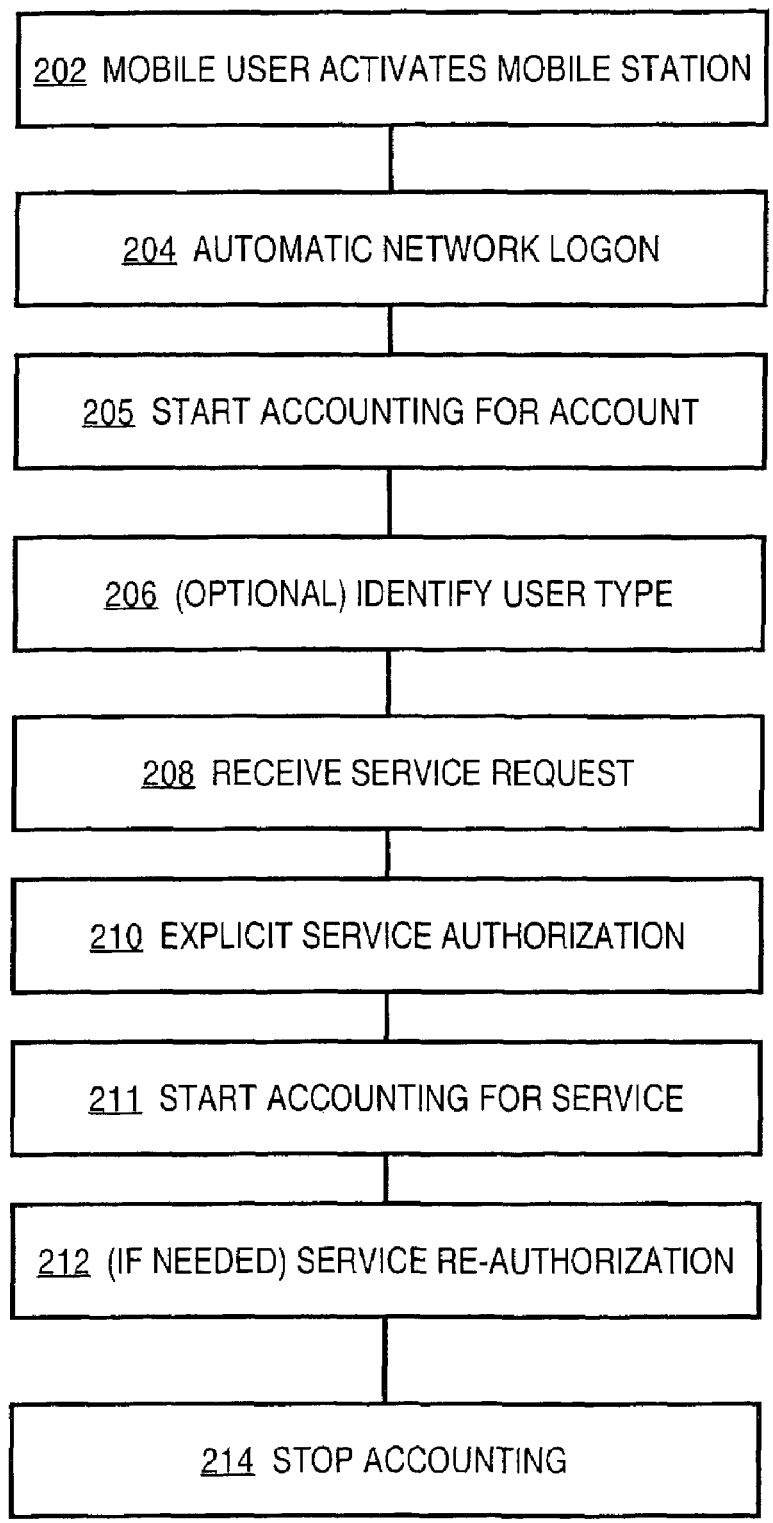
FIG. 2 is a flow diagram that illustrates a high-level view of functions that are provided in prepaid billing support using explicit service authorization.

FIG. 2 is a flow diagram that illustrates a high-level view of functions that are provided in prepaid billing support using explicit service authorization. In later sections herein, each operation of FIG. 2 is described in further detail in the context of specific embodiments.

In block 202, a mobile user activates a mobile device. In block 204, network elements automatically log the mobile user on to a service provider network. Block 204 may include performing user authentication and identifying a user service profile that specifies pre-selected services. Assuming that the mobile user is properly authenticated, in block 205, accounting for the user account is started; the accounting information may include audit records, log entries, data to support invoices, etc.

In block 206, optionally, a user type is determined for the mobile user. Examples of user types include non-prepaid user, normal volume base prepaid user, normal time based prepaid user, normal volume & time based prepaid user, premium volume based prepaid user, premium time based prepaid user, premium volume & time based prepaid user, etc. Determining a user type may be useful for external applications.

In block 208, a service request is received. In certain embodiments, either the mobile user issues an explicit request for a service, or a service in the user profile is automatically requested or a network based agent acting on behalf of the mobile user issues an explicit request for a service. In block 210, explicit service authorization is performed. Block 210 may involve determining whether the mobile user has sufficient prepaid credit to permit granting the service to the user, determining an allowed quota value in terms of service time or volume, etc. Assuming that service authorization is successful, accounting for the service starts in block 211. Block 211 may involve generating accounting records that reflect user consumption of services, audit records, etc.

In block 212, service re-authorization is optionally performed. Service re-authorization typically is performed when the quota value associated with the mobile user becomes zero after a period or volume of use. Alternatively, re-authorization may be performed when the user changes locations, acquires a different quality of service (QoS) in the network, etc. In block 214, accounting information is stopped.

In various embodiments, the SSG prepaid billing processes described herein offer the benefits of real-time billing per service, online display and refilling of credit balances, concurrent service access, and micro payments.

In real-time billing per service, two approaches may be used. In a first approach, conventional SSG accounting information is used. In a second approach, counters within SSG store the remaining value (e.g., time, bytes, packets) available to a user for a particular service.

The first approach allows for real-time billing with maximum flexibility, regardless of the type of service and billing scheme; that is, users receive usage-based billing based on a flat rate, airtime, or volume. The approach that is used for packet data services also can integrate known prepaid solutions for voice prepaid and circuit-switched data. Standard interfaces and protocols may be used, such as the RADIUS protocol.

In this approach, the SSG sends information using RADIUS to the billing system. The SSG acts as both a RADIUS server for the Dashboard 112, and as a client to the configured RADIUS server. In one embodiment, RADIUS accounting records are generated and sent to a RADIUS server in response to Account Logon, Account Logoff, Connection Start, Connection Stop, and RADIUS Interim Accounting per service.

Figure 3:
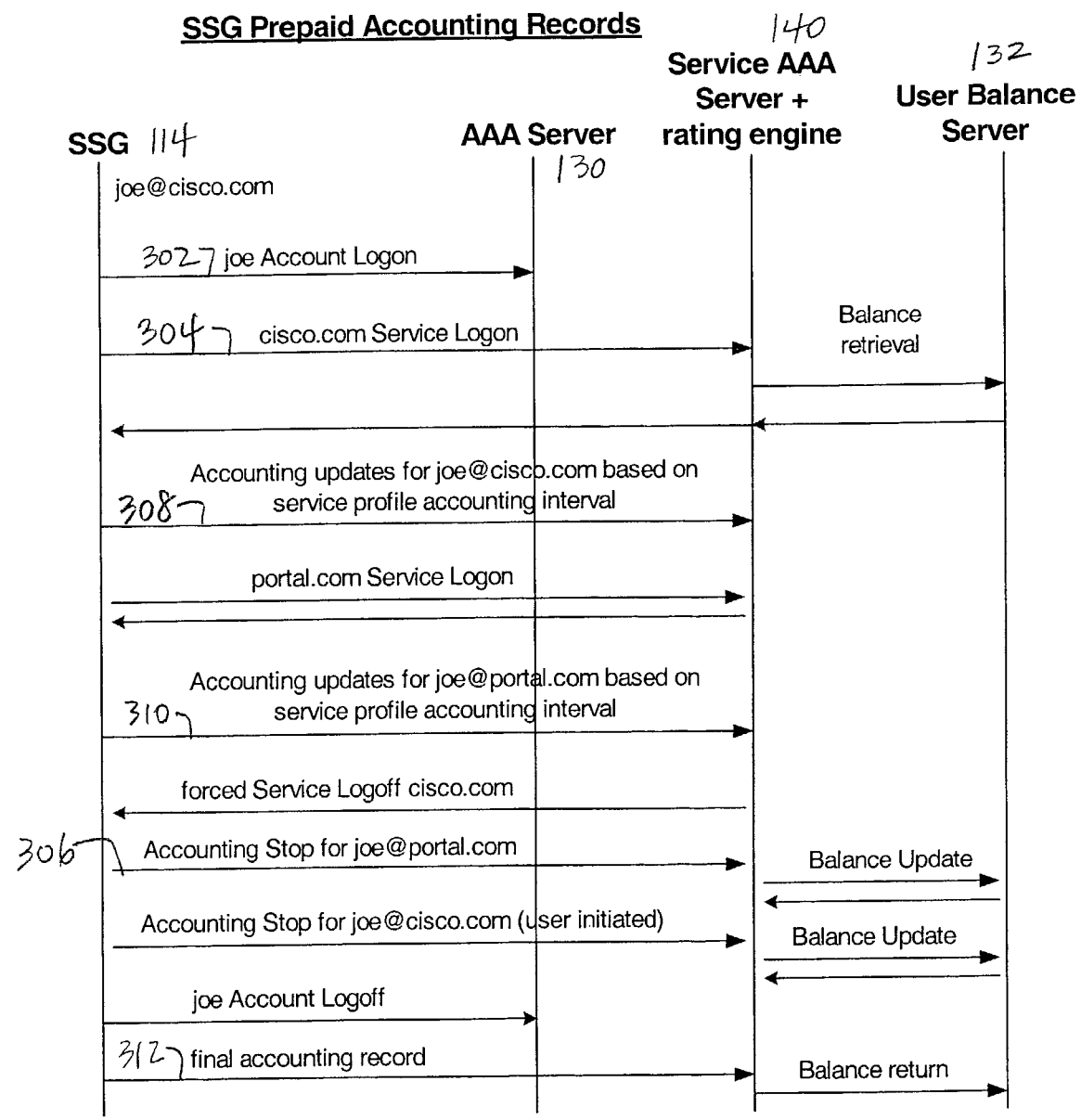
FIG. 3 is a message flow diagram that illustrates how accounting records may be generated in this approach.

FIG. 3 is a message flow diagram that illustrates how accounting records may be generated in this approach. Assume that a user identified as "joe@cisco.com" activates a mobile device. In message 302, SSG 114 issues an Account Logon message for "joe" to AAA server 130. Thus, when a user logs on, the SSG sends a RADIUS accounting request on behalf of the user to the accounting server. When the user accesses a service ("Connection Start"), the SSG sends a RADIUS accounting request to the accounting server, as in message 304. When a user terminates a service ("Connection Stop"), the SSG sends a RADIUS accounting request to the accounting server, as shown by message 306. Optionally, certain embodiments support Radius Interim Accounting per service; in these embodiments, when a users logs on, the SSG sends a RADIUS accounting request on behalf of the user to the accounting server, which is represented by the Accounting Updates flow(s).

The SSG sends interim accounting updates periodically, as indicated by messages 308, 310. The time interval (in seconds) per service is configurable. For Account Logoff, when a user logs off, as shown by message 312, the SSG sends a RADIUS accounting request on behalf of the user to the accounting server.

In a second approach, the service AAA server/rating engine 140 decides how long the mobile station 102 is authorized to access a service. Message flows for this approach are described in the next section in the context of other operations. In this approach, the service AAA server/rating engine 140 authorizes a user to access a service for a specific time or volume. In one embodiment of the invention, the AAA server/rating engine 140 reserves a portion of the user's outstanding balance corresponding to the authorized value. The authorized value or "quota" is stored in the SSG. When the quota reaches zero, the SSG sends another Access Request, termed a re-authorization request, on behalf of the user to receive the amount of time or value the user is allowed to connect to a service. No interim accounting updates are sent.

The AAA server/rating engine 140 debits the reserved quota from the user's outstanding balance and reserves a new portion of the balance for subsequent use corresponding to the quota value returned at service re-authorization. The AAA server/rating engine can use operator-specified business logic to determine the value of the quota returned at service authorization and re-authorization. For example, the quota may correspond to a fixed percentage of the user's outstanding balance.

In certain embodiments, SSG prepaid billing logic 114A and AAA prepaid billing logic 130A can support concurrent service access within one PDP context. In general, mobile service operators desire to access any service through one PDP context. This saves resources in the mobile infrastructure, and also overcomes current storage and processing limitations of handsets and other mobile devices. In one embodiment, each service to which SSG 114 can connect mobile station 102 can be configured in the SSG for concurrent or sequential access. Concurrent access allows users to log on to a service while simultaneously connected to other services.

Sequential access requires the user to log off from other services before accessing a service configured for sequential access.

In one specific embodiment, a service mode value defined in a RADIUS Service-Info vendor-specific attribute (VSA) specifies whether a user can simultaneously log on to the associated service and connect to other services, or whether the user cannot access any other services while using the associated service.

In still other embodiments, mobile station 102 can make micro payments while an account is running. After checking the current credit balance of the mobile station 102, Dashboard 112 can charge any service at any time to the user's prepaid account. Before a transaction takes place, users provide identification, such as a username and password (PIN), and then proceed with deduction of credit balance amounts.

Figure 4:
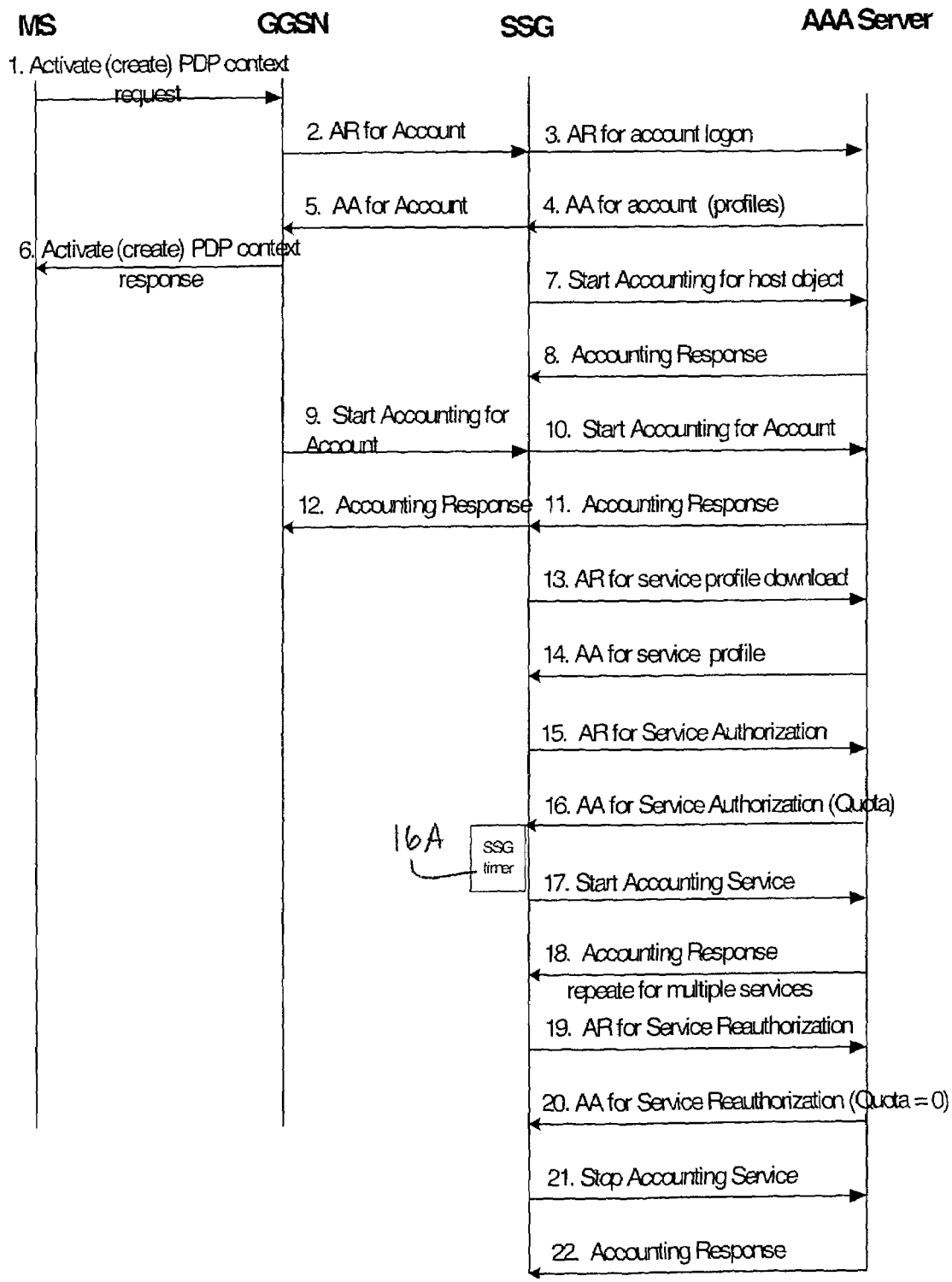
FIG. 4 is a message flow diagram that illustrates an example message interaction among certain network elements to provide prepaid billing support using explicit service authorization.

3.0 Prepaid Billing Support Using Explicit Service Authorization 3.1 Message Flow FIG. 4 is a message flow diagram that illustrates an example message interaction among certain network elements to provide prepaid billing support using explicit service authorization. For purposes of illustrating a clear example, FIG. 4 is described in the context of the network arrangement of FIG. 1. Further, reference numerals for steps of FIG. 4 correspond to blocks of FIG. 2. However, the processes described below for FIG. 4 are applicable to any network arrangement that is functionally similar to FIG. 1.

Generally, Step 1 through Step 6 of FIG. 4 implement an automatic logon process in which SSG 114 acts as a RADIUS proxy for the GGSN 106B, or potentially for other RADIUS clients. Access-Request messages received from the GGSN 106B are proxied transparently by SSG 114 to the AAA server 130. Successful authentication by AAA server 130 causes SSG 114 to create a host object associated with the IP address allocated to the mobile user. SSG 114 then allows the user to connect to its subscribed services either automatically via defined auto-services or by user selection using the Dashboard 112.

Details of the automatic logon process are now provided. In Step 1 of FIG. 4, the mobile station 102 ("MS") sends an Activate PDP Context Request message to the SGSN. The message includes values identifying the PDP type, PDP address, APN, QoS Requested, and PCO. The mobile station 102 specifies either a permanently assigned static PDP address or otherwise indicates the use of a dynamically assigned PDP address, when a PDP context is activated. In response, the SGSN validates the Activate PDP Context Request based on the information from the MS and the subscription records, and then send a Create PDP Context request to the GGSN 106B.

In Step 2, the GGSN 106B sends a RADIUS authentication and authorization Access-Request message to the RADIUS server based on the information received from MS. In one embodiment, support for systems using Dynamic Host Control Protocol (DHCP) is provided, in the following way. If DHCP is used for IP address assignment, DHCP processing is done before RADIUS negotiation. Thus, an IP address is assigned by the GGSN 106B using DHCP and included in Attribute 8 of the Access-Request message. If Attribute 8 is present in the message, then the SSG assigns the indicated IP address to the host object.

In one embodiment, the Access-Request message has the attributes specified in Table 1.

TABLE 1

RADIUS Attributes: Access Request

| Attr# | Attribute name | Description | Note |
|---|---|---|---|
| #1 | User-Name | MS users name | |
| #3 | PAP/CHAP-password | PAP/CHAP password | |
| #4 | NAS IP Address | GGSN IP address | |
| #6 | Service-Type | Framed-User | |
| #7 | Framed-Protocol | GPRS-PDP or PPP | |
| #30 | Called-Station-Id | APN | |
| #31 | Calling-Station-Id | MSISDN | |
| #33 | Proxy-State | Proxy State | |
| #60 | CHAP-Challenge | CHAP challenge | Present if Challenge Handshake Authentication Protocol ("CHAP") is used |
| #61 | NAS-Port-Type | Async (Value = 0) | |

Other attributes may be provided in other embodiments. Since the SSG 114 transparently proxies Access-Accept messages to the AAA server 130, the content of the messages is defined by the GGSN 106B as RADIUS client, rather than by SSG 114. The SSG 114 normally does, however, append the Proxy-State attribute (#33) to proxied Access-Requests, and uses this attribute in accordance to RFC2865.

In Step 3 of FIG. 4, the Access Request packet from the GGSN 106B is transparently proxied from the SSG 114 to the AAA server 130, meaning that the SSG automatically forwards the Access Request packet to the AAA server. As a result, all attributes are transmitted to the AAA server. The proxied Access Request contains the user name, PAP/CHAP password, identifiers of called and calling stations, and all other attributes identified above with respect to Step 2.

In Step 4, assuming that the user is properly authenticated, AAA server 130 sends an Access-Accept message to the SSG 114. The returned Access-Accept normally will contain SSG VSAs. In one embodiment, the VSAs define the user's service list or profile. An example of a service profile is provided in Table 2:

TABLE 2

EXAMPLE SERVICE PROFILE user1 Password = "cisco"
  Service-Type = Framed-User,
  Account-Info = "Ninternet-blue",
  Account-Info = "Niptv",
  Account-Info = "Ngames",
  Account-Info = "Ndistlearn",
  Account-Info = "Ncorporate",
  Account-Info = "Nshop",
  Account-Info = "Nbanking",
  Account-Info = "Nvidconf"

In one embodiment, the presence of the attribute Service-Info="Z" in the Service Profile indicates that the associated service requires explicit authorization before activation; that is, it is a pre-paid service. If this attribute is not present, the service is a post-paid service.

Table 3 provides an example of RADIUS Attributes of the Access Accept message of Step 4.

TABLE 3

EXAMPLE RADIUS ATTRIBUTES-ACCESS-ACCEPT

| Attr# | Attribute name | Description | Note |
|---|---|---|---|
| #6 | Service-Type | Framed-User | |
| #7 | Framed-Protocol | GPRS-PDP or PPP | |

TABLE 3-continued

EXAMPLE RADIUS ATTRIBUTES-ACCESS-ACCEPT

| Attr# | Attribute name | Description | Note |
|---|---|---|---|
| #8 | Framed-IP-Address | Authorized IP address for dynamic MS | |
| #9 | Framed-IP-Netmask | Mask for the authorized IP address | |
| #10 | Framed-Routing | None | |
| #12 | Framed-MTU | The maximum transmission unit | |
| #25 | Class | "Yes" | |
| #26 | Vendor-Specific | SSG VSAs | Multiple VSAs |
| #28 | Session-Idle time | Purge timer for a PDP context | |
| #33 | Proxy-State | Proxy State | |

Example SSG VSAs for the Access-Accept message of Step 4 are set forth in

APPENDIX A

In Step 5, the SSG 114 saves the retrieved user profile, strips all SSG VSAs from the Access-Request, and relays the modified Access-Request to the GGSN 106B. Additional attributes may be provided, having contents defined by the RADIUS client (e.g. the GGSN).

In Step 6, a PDP context is activated. In one embodiment, GGSN 106B assigns a PDP address to the dynamic address requested by the mobile station 102. The PDP address may come either from the DHCP or the RADIUS authorized IP address, depending on the specification for the APN to which the PDP context is created. The GGSN 106B then creates a new entry in its PDP context list and generates a Charging ID value to start real-time metering and generate call detail records ("CDR"). Further, the GGSN 106B returns a Create PDP Contest Response message to the SGSN. The SGSN inserts PDP address received from the GGSN 106B in its PDP context and returns an Activate PDP Context Accept message to the mobile station 102.

In one approach, the MSISDN value may be used as a unique identifier for RADIUS clients. However, this approach does not allow for access technologies that do not provide an MSISDN. In these cases, the unique identifier may be the User-Name value, which is guaranteed to be present. Thus, if no MSISDN is present in proxy RADIUS Requests, then SSG 114 adds the MSISDN attribute and populates it with the user name. SSG 114 then continues to use the MSISDN internally as the unique endpoint identifier. This mechanism also guarantees that the MSISDN is present in all RADIUS packets that are forwarded to the Billing Server 132. Further, the MSISDN is used as the unique identifier since the user name is not guaranteed to be unique. For example, Wireless Access Protocol (WAP) use anonymous access and have a common user name. However, in these cases a unique MSISDN is present.

The Access-Accept also may contain SSG VSAs that define the operation of SSG 114; because these VSAs are not directly related to prepaid billing processes, they are not discussed here. Further, all SSG VSAs are stripped from the Access-Accept before proxying it back to the RADIUS client.

In Step 7, the SSG 114 sends a Start Accounting record to the AAA server 130 associated with the account logon, and provides information from the host object. Corresponding RADIUS Attributes are set forth in Table 4:

TABLE 4

RADIUS ATTRIBUTES FOR ACCOUNT LOGON

| Attrib# | Attribute name | Description | Note |
|---|---|---|---|
| 1 | User-Name | User Name | |
| 4 | NAS IP Address | SSG IP address | |
| 5 | NAS-Port | Physical port number | 0 |
| 6 | Service-Type | Framed | |
| 7 | Framed-Protocol | PPP | |
| 8 | Framed-IP-Address | Assigned MS IP Address | |
| 25 | Class | Class | |
| 30 | Called-Station-Id | APN | |
| 31 | Calling-Station-Id | MSISDN | |
| 40 | Acct-Status-Type | "Start" | |
| 41 | Acct-Delay-Time | Time in seconds that SSG has been trying to send the start accounting request | |
| 44 | Acct-Session-Id | Session ID | |
| 55 | Time-Stamp | Time-Stamp | Note 1 |
| 61 | NAS-Port-Type | Virtual (Value = 5) | |

In one embodiment, SSG 114 places time-stamp values in RADIUS packets that the SSG sends to the Billing Server 132; in one specific embodiment, attribute "55" as defined in RFC2869 may be used.

Step 8, the AAA Server 130 sends an Accounting Response to SSG 114. In Step 9, GGSN 106B sends a Start-Accounting-Request to the SSG 114 and provides the charging, ID, CDR start record time and other accounting related attributes. Example attributes in the Accounting Start message are shown in Table 5:

TABLE 5

RADIUS Attributes For GGSN Accounting Start

| Attrib# | Attribute name | Description |
|---|---|---|
| 1 | User-Name | Service Name |
| 4 | NAS IP Address | GGSN IP address |
| 6 | Service-Type | Outbound |
| 7 | Framed-Protocol | GPRS-PDP or PPP |
| 8 | Framed-IP-Address | Assigned MS IP Address |
| 25 | Class | Class |
| 26 | Vendor-Specific | GPRS-SGSN-ADDRESS |
| 26 | Vendor-Specific | GPRS-LOCAL-TIME-ZONE |
| 30 | Called-Station-Id | APN |
| 31 | Calling-Station-Id | MSISDN |
| 40 | Acct-Status-Type | "Start" |
| 41 | Acct-Delay-Time | Time in seconds that GGSN 106B has been trying to send the start accounting request |
| 44 | Acct-Session-Id | Charging ID |
| 45 | Acct-Authentic | RADIUS |
| 55 | Time-Stamp | Time-Stamp |
| 61 | NAS-Port-Type | Async (Value = 0) |
| 151 | Ascend-Session-Svr-Key | Configurable - used for POD |

The class attribute in accounting packets that are proxied from the RADIUS client is the same class attribute in accounting packets generated by SSG 114, such as the packeted that are returned in the original Access-Accept for user authentication.

In Step 10, the Start-Accounting-Request packet from the GGSN 106B is transparently proxied from SSG 114 to AAA server 130, thus ensuring the propagation of all attributes to the server. In one embodiment, SSG accounting is a separate operation with respect to GGSN accounting; therefore, the SSG 114 does not modify accounting records from the GGSN 106B. The attributes of the proxied Start-Accounting-Request packet are as in Table 5.

In Step 11, the AAA Server sends an Accounting response to SSG 114. There are no SSG VSAs involved. In Step 12, the SSG 114 transparently relays the Accounting-Response back to the GGSN 106B.

According to an embodiment, SSG 114 performs explicit service authorization, to ensure that a user has sufficient credit to connect to a service. Generally, Step 13 to Step 16 of FIG. 4 represent explicit service authorization. The Billing Server 132 returns available quotas to the SSG 114 when a service is activated, either using auto-service activation or through user selection of a new service. A quota may comprise a volume value, monetary value, time value, etc. If the returned available quota is greater than zero or is not present then SSG 114 allows connection to the service, and commences metering usage of the service based on the allotted quota (if present).

In Step 13, an Access-Request for a service profile is issued, and in Step 14, an Access-Accept for the service profile is sent in response. In one embodiment, the mobile station 102 connects to Dashboard 112, a RADIUS Access-Request/Accept message exchange is performed between the Dashboard and the SSG 114. As a result, SSG 114 communicates the user's profile, which it originally retrieved from AAA server 130, back to Dashboard 112. In this way, the Dashboard 112 builds the service list.

When a user wishes to log onto a service, the Dashboard 112 forwards an Access-Request to SSG 114. SSG 114 then attempts to retrieve the service profile from the AAA server 130 using the service name, the globally configured service password, and the service type set to "outbound." In response, a service profile is retrieved from the AAA server. An example of a service profile is:

corporate         Password="servicecisco",        Service-Type=Outbound
    Service-Info="ICorporate Intranet",
    Service-Info="R154.154.154.0;255.255.255.0",
    Service-Info="S10.0.48.3;1812;0;cisco",
    Service-Info="MC",
    Service-Info="TX"

The Access Request for Service Profile used in Step 13 has the attributes shown in Table 6, and the Access Accept for Service Profile download has the attributes shown in Table 7.

TABLE 6

ACCESS REQUEST FOR SERVICE PROFILE

| Attrib# | Attribute name | Description |
|---|---|---|
| 1 | User-Name | Service Name |
| 2 | PAP password | Global Service Profile Password |
| 4 | NAS IP Address | SSG IP address |
| 6 | Service-Type | Outbound |
| 61 | NAS-Port-Type | Async (Value = 0) |

TABLE 7

ACCESS ACCEPT FOR SERVICE PROFILE DOWNLOAD

| Attrib# | Attribute name | Description | Note |
|---|---|---|---|
| 6 | Service-Type | Outbound | |
| 26 | Vendor-Specific | SSG VSAs | Multiple VSAs |

In other embodiments, the SSG 114 is not required to download the service profile for every connection request. Therefore, in certain embodiments, the message exchange of Step 13 and Step 14 occurs only for the first subscriber logon to a particular service.

In Step 15, for service authorization, a new Access-Request is generated once the service has been identified. The service may be identified from an existing Service object, or by means of a service profile download. The new Access-Request is generated and sent regardless of the service type, e.g. pass-through, proxy or tunnel.

In one embodiment, the user-name (attribute #1) is the subscriber name, as opposed to the service name; the service name is included as a service name VSA. Further, an MSISDN value obtained from the mobile station 102 is placed in attribute #31 to provide additional user identification. The MSISDN value provides additional user identification that is guaranteed to be unique by the mobile network infrastructure. The MSISDN value may be the user-name if the access technology does not provide an MSISDN. For example, if the ground station elements, GGSN 106B, or other access elements, do not provide an MSISDN, then attribute #31 may carry a user-name value. If no MSISDN is present in the proxied RADIUS Requests, then SSG 114 adds the MSISDN attribute and populates it with the user name. SSG 114 then continues to use the MSISDN internally as a unique endpoint identifier.

This approach also guarantees that the MSISDN is available to be present in all RADIUS packets forwarded to the Billing Server 132, including proxied packets and packets that are generated by SSG 114.

Table 8 presents attribute values for the new Access-Request that is generated in Step 15:

TABLE 8

ACCESS-REQUEST FOR SERVICE AUTHORIZATION

| Attr # | Attribute Name | Description | Note |
|---|---|---|---|
| #1 | User-Name | MS Subscriber Name | |
| #2 | PAP password | Global Service Profile Password | |
| #4 | NAS IP Address | SSG IP address | |
| #6 | Service-Type | Framed-User | |
| #26 | Vendor-Specific | Name of service | Code: 251, 'N' |
| #31 | Calling-Station-Id | MSISDN | |
| #55 | Time-Stamp | Time-Stamp | |
| #44 | Acct-Session-Id | Session ID | |
| #61 | NAS-Port-Type | Async (Value = 0) | |

A session identifier is added to all connection-oriented RADIUS packets; the session identifier value is unique for a given connection. That is, the value is unique per user, per service. In one embodiment, the Acct-Session-Id value (attribute #44) holds the session identifier, but is only added to Accounting-Request packets (start and stop). In other embodiments, the Acct-Session-Id value (attribute #44) also is used in authorization and re-authorization request packets.

To avoid unnecessary service authorization exchanges with the billing server when a service is not subject to billing, or may not be charged to a pre-paid account, a Service-Info VSA provides an indication to SSG 114, via the service profile, of whether service authorization is required for a given service. In one embodiment, the Service-Info VSA is defined as follows:

\*\*\* Authorization Required
code: 251, 'Z'
len: 3

```
+-+-+-+-+-+-+-+-+
|a|b|   c   |d|e|f|
+-+-+-+-+-+-+-+-+
``` a = 26          (Radius attribute for vendor specific)
b = len         (length of the Radius vendor-specific)

-continued

| | |
|---|---|
| c = 9 | (Cisco vendor ID) |
| d = 251 | (sub-attribute ID for SSG Service-Info) |
| e = len | (length of the vendor-specific attribute) |
| f = 'Z' | (service-info code for authorization required) |

In Step 16, the AAA server 130 assigns a quota based on the user and service details. The quota is returned in one of the VSAs in the Access-Accept for the service authorization request. Although the AAA Server 130 returns the quota value, the quota value may be assigned by the Billing Server 132 through communication between the AAA Server and the Billing Server. The SSG 114 sends Authorization Requests for every auto-logon service. Authorization is provided based on the presence or content of the quota VSA as defined below. Table 9 presents an example attribute definition for an Access Accept message for Subscriber to Service Authorization:

TABLE 9

EXAMPLE ATTRIBUTE DEFINITION FOR ACCESS ACCEPT MESSAGE FOR SUBSCRIBER TO SERVICE AUTHORIZATION

| Attr # | Attribute name | Description | Note |
|---|---|---|---|
| #6 | Service-Type | Framed-User | |
| #26 | Vendor-Specific | Quota VSA | Format below |

In one embodiment, the Quota VSA in attribute 26 is defined as follows:

```
code: 253, 'Q'
len: >12

+-+-+-+-+-+-+-+-+-+-+....-+
|a|b|  c  |d|e|f|g|  h   |
+-+-+-+-+-+-+-+-+-+-+....-+ a = 26      (Radius attribute for vendor specific)
b = len     (length of the Radius vendor-specific)
c = 9       (Cisco vendor ID)
d = 253     (sub-attribute ID for SSG Control-Info)
e = len     (length of the vendor-specific attribute)
f = 'Q'     (control-info code for prepaid Quota)
g = 'T'/'V' (Quota sub-code for 'Time or 'Volume)
h = <value> (ASCII numeric string representing the quota value)
```

As indicated by SSG Timer 15A in FIG. 4, a timer mechanism is used to monitor usage of services, as further described below.

In one embodiment, if the user has a valid (i.e., non-zero) quota, then SSG 114 creates a connection to the service with the initial quota value. A value of zero in a quota means the user is not authorized (i.e., has insufficient credit) to use that service and the connection is not made. If the quota attribute is not present, then the connection object is created without any quota value. Quota values also may be present in Access-Accept messages for post-paid users, or for non-chargeable services. In these cases the quotas effectively either represent the credit limit of the user, or a near-infinite period respectively.

In one embodiment, quotas are expressed in seconds for time-based quotas, and in bytes for volume-based quotas. A command-line interface ("CLI") command is used to establish how volume quotas are calculated. Examples of calculation mechanisms include inbound volume, outbound volume, or both.

A service authorization may contain a quota that is based on both time and volume. For example, a particular service provider may establish billing based on one unit, but the rate or tariff may change based on a different unit. As a specific example, a volume-based tariff may switch to a cheaper tariff after 6 pm. In such a case, the volume quota is associated with an expiration time value, and the quota is re-evaluated upon expiration of the time value. If the expiration time expires before the volume quota is used up, then SSG 114 automatically re-authorizes the user to the service, indicating the actual volume consumed. Similar logic may be used for time-based tariffs where the tariff changes based on volume.

Several different approaches may be used for determining or allotting the actual quota value at AAA Server 130 or Billing Server 132, as described further below in Section 3.2.

In Step 17, SSG 114 sends a Start-Accounting packet to the AAA Server for every service connection. Table 10 presents attributes for the Start-Accounting packet:

TABLE 10

RADIUS Attributes for Start Accounting (Connection)

| Attr # | Attribute name | Description | Note |
|---|---|---|---|
| #1 | User-Name | Subscriber Name | |
| #4 | NAS IP Address | SSG IP address | |
| #5 | NAS-Port | Physical port number | Value is 0 |
| #6 | Service-Type | Framed | |
| #7 | Framed-Protocol | PPP | |
| #8 | Framed-IP-Address | Assigned MS IP Address | |
| #25 | Class | Class | |
| #26 | Vendor-Specific | Service name (251/'N') | |
| #26 | Vendor-Specific | Service user name (251/'U') | |
| #26 | Vendor-Specific | Service type (251/'T') | |
| #30 | Called-Station-Id | APN | |
| #31 | Calling-Station-Id | MSISDN | |
| #40 | Acct-Status-Type | "Start" | |
| #41 | Acct-Delay-Time | The seconds that GGSN has been trying to send the start accounting request | |
| #44 | Acct-Session-Id | Charging ID | |
| #55 | Time-Stamp | Time-Stamp | |
| #61 | NAS-Port-Type | Virtual (Value = 5) | |

A session identifier is provided in the form of the Acct-Session-Id (attribute #44) Attribute #55 provides a timestamp in the RADIUS packet.

In Step 18, the SSG 114 receives an Accounting Response packet from the AAA Server 130.

In Step 19, an Access-Request is optionally issued if a service re-authorization is needed. During the lifetime of a prepaid connection, SSG 114 decrements the available quota based on either the volume of data passed or the time elapsed, as appropriate. When the quota reaches zero, SSG 114 issues a re-authorization request to the Billing Server 132. As indicated in Table 11 below, the re-authorization request is structured in a form that is similar to the original service authorization request, including the subscriber user-name and the MSISDN; the re-authorization request further comprises the VSA for prepaid quotas, indicating the actual quota used. In a re-authorization request, the quota used is normally the same value as the initially allocated quota. The presence or absence of the quota VSA in service authorization requests enables the billing server to differentiate between service authorization requests and service re-authorization requests.

The format of the Quota Used VSA is the same as the VSA used to indicate the initial available quota.

Unsuccessful service re-authorization is indicated by an Access-Accept message containing a quota of zero. If service re-authorization is unsuccessful, then SSG 114 terminates the connection to the service.

Service re-authorization may be required for other reasons, such as tariff changes based on time-of-day and/or usage, location changes, QoS changes, etc., or changes in any other parameter. To support multiple reasons for re-authorization, the billing server needs to be informed of the reason for the re-authorization and the allocated quota consumed prior to re-authorization. Accordingly, in one embodiment, a re-authorization reason value and consumed quota value are carried in attribute 26 of the re-authorization access request, an example of which is set forth in Table 11.

TABLE 11

RADIUS Attributes for Access Request (Re-authorization)

| Attr # | Attribute name | Description | Note |
|---|---|---|---|
| #1 | User-Name | MS Subscriber Name | |
| #2 | PAP password | Global Service Profile Password | |
| #4 | NAS IP Address | SSG IP address | |
| #6 | Service-Type | Framed-User | |
| #26 | Vendor-Specific | Name of service | Code: 251, 'N' |
| #26 | Vendor-Specific | Actual Quota Consumed | |
| #26 | Vendor-Specific | Re-Authorization Reason | |
| #31 | Calling-Station-Id | MSISDN | |
| #44 | Acct-Session-Id | Session ID | |
| #55 | Time-Stamp | Time-Stamp | |
| #61 | NAS-Port-Type | Async (Value = 0) | |

A session identifier and time stamp are included, as in Table 10. The VSA for conveying a re-authorization reason in attribute 26 may have the same general format for SSG Quota VSAs as defined previously:

```
code: 253, 'Q'
len: >12

+-+-+-+-+-+-+-+-+-+-+....-+
|a|b|   c   |d|e|f|g|  h  |
+-+-+-+-+-+-+-+-+-+-+....-+ a = 26           Radius attribute for vendor specific
b = len          length of the Radius vendor-specific
c = 9            Cisco vendor ID
d = 253          sub-attribute ID for SSG Control-Info
e = len          length of the vendor-specific attribute
f = 'Q'          control-info code for prepaid Quota
g = 'R'          Quota sub-code for Re-authorization reason
h = <reason>     Numeric value indicating re-authorization
    reason:
       0 = Primary quota consumed
       1 = Tariff changed (i.e. secondary quota consumed)
       2 = Location changed
       3 = QoS changed
```

The exact format of the data within this VSA is not critical. For example, alternatively, R=0 for Primary Quota Consumed and R=1 for Returning Residual Quota. The illustrated format is sufficient when the reason for re-authorization is consumption of the alloted (primary) quota. In other embodiments, different data formats are used to convey other information pertinent to other re-authorization reasons.

In Step 20, when there is enough balance left, AAA Server 130 sends an Access Accept message to SSG 114 with the next Quota value. When there is no balance left, the AAA Server 130 responds with an Access Accept message (e.g., a message of type 253, with Q=zero value indicates that the balance is zero.

In Step 21, when SSG 114 receives the Access Accept message with a zero balance value, it destroys the connection object, and sends a final Stop Accounting packet for the service to the AAA Server 130, so that the user balance can be updated. Table 12 is an example of attributes for a Stop Accounting message.

TABLE 12

Corresponding RADIUS Attributes - Stop Accounting (Connection)

| Attr # | Attribute name | Description | Note |
|---|---|---|---|
| #1 | User-Name | Subscriber Name | |
| #4 | NAS IP Address | SSG IP address | |
| #5 | NAS-Port | Physical port number | 0 |
| #6 | Service-Type | Framed | |
| #7 | Framed-Protocol | PPP | |
| #8 | Framed-IP-Address | Assigned MS IP Address | |
| #25 | Class | Class | |
| #26 | Vendor-Specific | Input byte count (253/'I') | |
| #26 | Vendor-Specific | Output byte count (253/'O') | |
| #26 | Vendor-Specific | Service name (251/'N') | |
| #26 | Vendor-Specific | Service user name (251/'U') | |
| #26 | Vendor-Specific | Service type (251/'T') | |
| #30 | Called-Station-Id | APN | |
| #31 | Calling-Station-Id | MSISDN | |
| #40 | Acct-Status-Type | "Stop" | |
| #41 | Acct-Delay-Time | Time in seconds that GGSN has been trying to send stop accounting request | |
| #42 | Acct-Input-Octets | Number of octets sent by user, uplink | |
| #43 | Acct-Output-Octets | Number of octets received by user, downlink | |
| #44 | Acct-Session-Id | Charging ID | |
| #46 | Acct-Session-Time | Duration of the session | |
| #47 | Acct-Input-Packets | Number of packets sent by the user | |
| #48 | Acct-Output-Packets | Number of packets received by the user | |
| #49 | Acct-Terminate-Cause | Reason that connection was terminated | |
| #55 | Time-Stamp | Time-Stamp | |
| #61 | NAS-Port-Type | Virtual (Value = 5) | |

As in Table 10, a session identifier and time-stamp is provided.

In Step 22, AAA Server 130 responds with an Accounting Response. After Step 22, when all balances reach zero, in certain embodiments a message is sent from SSG 114 to GGSN 106B indicating that the user is disconnected from all services.

In one embodiment, communicating traffic during the re-authorization time is allowed. If the Billing Server 132 returns a zero quota in a re-authorization response, then the connection is disconnected. However, if some data flowed across the connection during the re-authorization time, no accounting is performed for the data, causing potential loss of revenue to the service provider. Therefore, in another embodiment, a user is required to re-authorize the connection before the user consumes the entire allotted quota. A stored threshold value specifies the amount of remaining quota that triggers a requirement to re-authorize the connection. The threshold value may be expressed in bytes for volume-based connections, and may be expressed in seconds for time-based connections. In another embodiment, an administrator may configure SSG 114, using an appropriate command or other mechanism, to specify whether the SSG should pass or drop traffic during the re-authorization time.

After completing Step 22, the SSG 114 may need to perform other processing to establish a connection. However, after the SSG 114 receives a quota value in Step 16, if the SSG fails to bring up the connection for any reason, then the Billing Server 132 may be unaware that the allotted quota never will be used. Indeed, the Billing Server 132 may lock the allotted quota for a long time, making it unavailable for other connections. Accordingly, in one embodiment, SSG 114 informs the Billing Server 132 upon connection failure by returning the remaining quota. As a result, the returned quota can be used for other active connections immediately.

In one approach, SSG 114 returns a quota in this manner by sending RADIUS Accounting Start and Accounting Stop messages for the current connection. As SSG 114 could not able bring up the connection, no data had flowed on the connection. Accordingly, an Accounting Stop message is sent with the actual used amount as zero and the termination cause set as "service unavailable." The "service unavailable" termination cause is conventionally used under RADIUS when a network access server is unable to provide requested service, as specified in IETF RFC 2866. Five attributes, namely Accounting Session Time, Bytes In, Bytes Out, Packets In, and Packets Out (RADIUS attributes 42,43,46,47 and 48) are sent with zero values, so that Billing Server 132 immediately can reclaim the entire quota that is allotted during the connection authorization.

3.2 Quota Allotment Approaches

As part of Step 16 of FIG. 4, AAA Server 130 or Billing Server 132 may use several different approaches for determining a specific quota value for a connection. In one embodiment, a fragmented quota allotment approach is used; in another embodiment, a quota re-distribution approach is used.

3.2.1 Fragmented Quota Allotment

In the fragmented quota allotment approach, multiple concurrent connections can use a portion of a total quota available to a mobile user. Generally, during authorization or re-authorization, rather than allotting the full available user quota, the AAA Server 130 or Billing Server 132 allocates or allots a smaller fragment of the quota. This approach allows for simultaneous prepaid connections, and enables a mobile user to use the full quota for multiple different purposes.

In this approach, in response to an Access-Request for service authorization, the AAA Server 130 initially assigns only a portion of the total quota that is available to the user in the service authorization response. The allotted portion is designated as a "primary quota" and any additional quota is designated as a "secondary quota." The amount of the primary quota in proportion to the secondary quota may be determined by a fixed configuration parameter value, or dynamically based on characteristics of the requested service. SSG 114 then monitors both quotas for a particular connection. If the primary quota expires, then normal operation continues because the user still has secondary quota available. If the secondary quota expires, then the re-authorization request contains the exact amount of the primary quota that has been consumed.

3.2.2 Quota Re-Distribution Approach with Idle Timeout

The fragmented allotment approach is useful, but has the disadvantage that primary quota amounts essentially are locked in place for the duration of a connection. If the connection is not actively using the primary quota, there is no way to return the primary quota so that it can be used for other active connections. Thus, maximum and effective usage of the full user quota may be impaired. The re-distribution approach provides the capability of ensuring effective and maximum usage of the total user quota by allowing re-distribution of previously allotted quota portions among connections that actively need a quota value, based on monitoring real-time user traffic patterns.

Further, in the fragmented allotment approach, if the billing server returns a zero quota value at the time of a service logon time or re-authorization, then the corresponding connection is disconnected. There is facility for keeping the connection in a wait state, such that the connection is open but the traffic on that connection is dropped. Having a wait state enables users to replenish their quotas on the Billing Server 132 while the wait state is in effect. Thus, traffic is allowed on the connection immediately after the next re-authorization. Without a wait state, the user may have disconnected from the service and may need to perform a service logon again after refilling the user's quota.

Figure 5A:
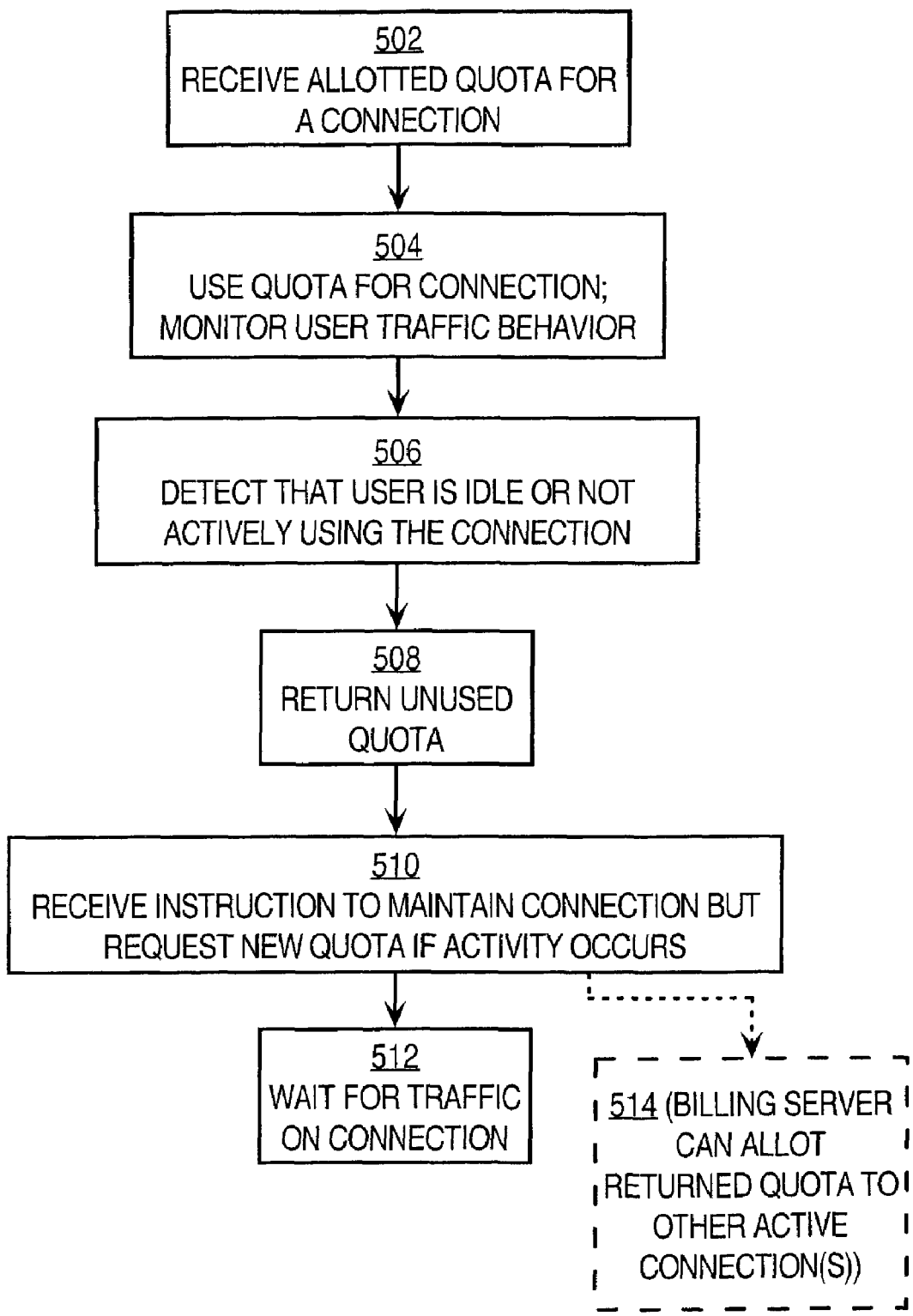
FIG. 5A is a flow diagram providing a high-level overview of a process of re-distributing quota values.

FIG. 5A is a flow diagram providing a high-level overview of a process of re-distributing quota values. In block 502, a quota allotted for a connection is received. For example, Billing Server 132 allots a quota value, which is received at SSG 114. In block 504, the SSG uses the quota for the connection, while simultaneously monitoring usage of the connection.

In block 506, the SSG detects that the connection is idle, or the connection is not actively in use, based on expected network traffic for a particular connection type or service type, or other user behavioral parameters. In response, in block 508, the amount of unused value associated with the quota is returned. For example, SSG 114 may send a message to the AAA server 130 that includes an amount of unused quota and a signal that the amount is returned or an indication that the user is idle.

In block 510, an instruction to maintain the connection, but to request a new quota if activity occurs, is received. For example, Billing Server 132 does not bring down the connection, but instructs SSG 114 to maintain the connection by issue a request for a new quota allotment upon detection of activity associated with the connection. In block 512, waiting for traffic on the connection is performed. For example, the SSG 114 now waits for further traffic on the connection. However, as indicated in block 514, the Billing Server 132 can allot the returned quota to other active connections.

Thus, an approach has been described that essentially introduces an idle timeout facility, so that if the user has not communicated network traffic for a specified amount of time, the residual quota is given back to the billing server, so that the user can obtain additional quota for the services that the user is actually using. However, the connection is maintained open, and the quota requested again when user again starts communicating traffic on that service or after a specified time.

This approach is useful when a user is automatically logged on to a plurality of prepaid services as soon as the mobile user logs on to the mobile network. Although automatic logon may occur, a user may not actually use all connections immediately after the logon. In that case, the approach herein automatically re-assigns quota to those connections that are active. Further, the approach herein helps ensure effective and maximum usage of the user quota. The approach allows the billing server to allot bigger quota chunks, since for active connections, these quotas are used actively reducing the number of re-authorizations done for such connection. For connections with more sporadic traffic, where there are longer periods of idle time interspersed with activity, allotment of a bigger chunk is not an issue, since the unused quota is returned back on inactivity.

The general process of FIG. 5A may be implemented in the context of the message flow depicted in FIG. 4. In general, the message flow of FIG. 4 is unchanged; however, in authorization or re-authorization responses, the AAA Server 130 or Billing Server 132 additionally returns an Idle Timeout value. In one embodiment, the Idle Timeout value is returned in RADIUS attribute 28. Further, the SSG 114 takes action with respect to a connection depending on both the Quota and Idle Timeout values.

Figure 6:
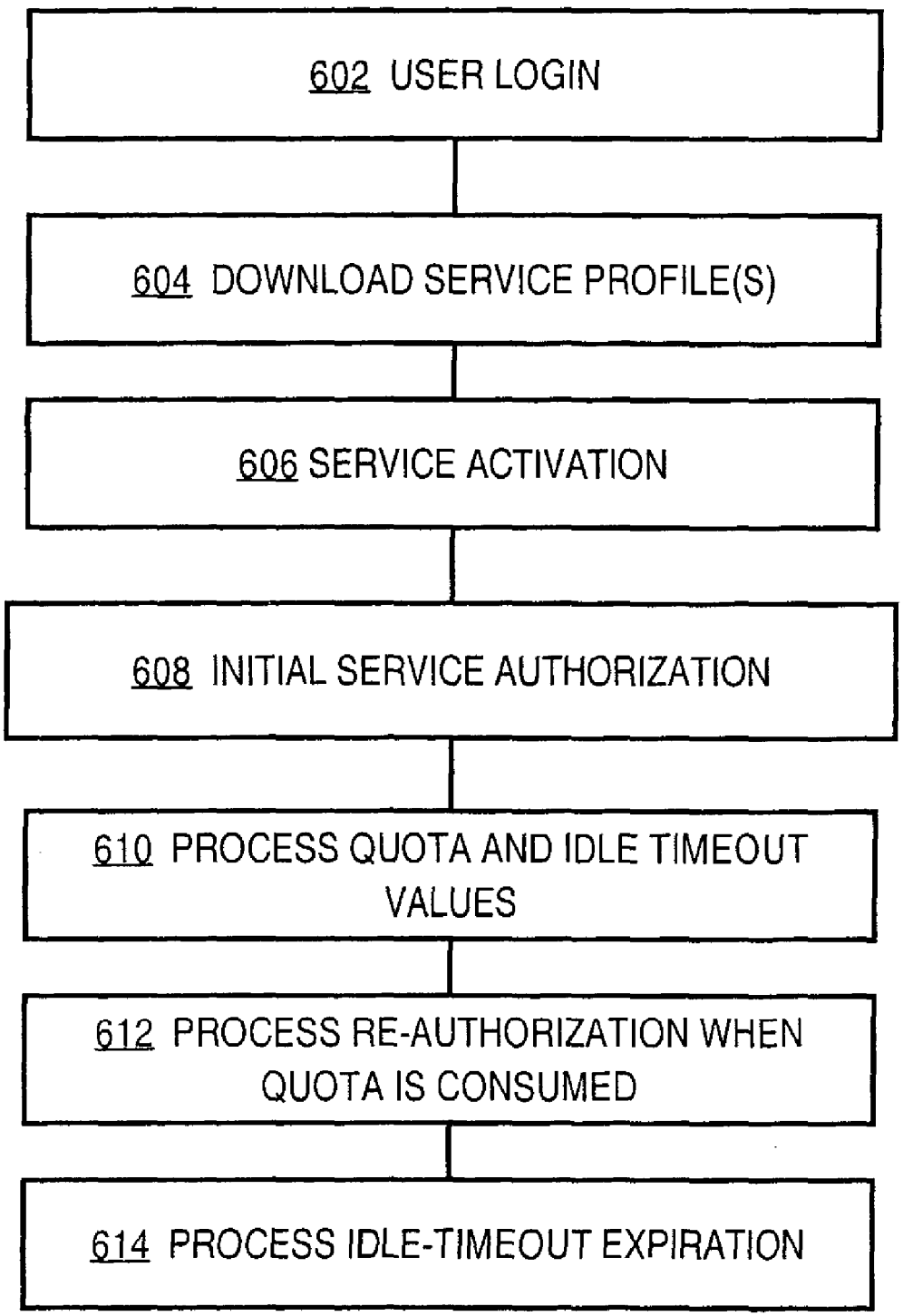
FIG. 6 is a flow diagram illustrating a process for re-distributing quota values using an idle timeout approach, according to one embodiment.

FIG. 6 is a flow diagram illustrating a process for re-distributing quota values using an idle timeout approach, according to one embodiment. In block 602, a mobile device user connects to the SSG 114. Such user login can occur via the SESM, Single Logon, Auto-Domain or any other suitable mechanism. As a result of the login phase, a Host Object is created on the SSG 114 for the user. Further, as indicated by block 604, during the login phase the SSG 114 downloads, from the AAA Server 130, one or more Service Profiles related to the services included into the User profile that has been activated.

Service activation occurs in block 606. A service can be activated directly by the user using SESM or can be activated at the login phase if the service is defined as an auto-logon service in the user profile. In block 608, initial service authorization occurs. For example, SSG 114 requests the AAA Server 130 to authorize the service, using the message flow shown in FIG. 4. In response, AAA Server 130 checks for the availability of a quota value, and generates a response that contains a Quota value and that may include an Idle-Timeout value. In one embodiment, five (5) possible responses may occur, having the following meanings:

1. Quota=0, do not open connection
2. Quota>0, open connection
3. Quota>0, Idle-Timeout>0, open connection and start idle timer
4. Quota=0, Idle-Timeout>0, open connection but block or redirect traffic
5. Quota=0, Idle-Timeout=0, open connection and wait for traffic Processing the Quota value and Idle-Timeout value is performed, as shown in block 610. If the Idle-Timeout attribute is not present, then the SSG 114 performs as indicated in the description above relating to FIG. 4. If the Idle-Timeout value is present, either with a positive or a value equal to zero, then SSG 114 always opens the connection, but its status depends on the combination of the Quota and Idle-Timeout value as indicated above. User traffic may be redirected when the Quota value is zero and when the Idle-Timeout value is greater than zero, if the availability of redirection is specified in the Service profile or configured on box. Otherwise, the traffic is dropped.

In this context, to "redirect" traffic means to divert traffic from a server that provides a requested service and transfer the traffic to the portal described above in which a user can replenish the prepaid credit balance associated with the user account. This enables SSG 114 to notify the user when the user has run out of quota and to enable the user to refill the quota without disconnecting from the service. A specific process for replenishment is described below in Section 3.3 in connection with FIG. 5B.

In block 612, re-authorization processing is performed when the Quota value is consumed. In one embodiment, when the Quota value has been is consumed, the SSG 114 performs the process specified above with respect to FIG. 4, in which the SSG requests additional Quota from the AAA Server 130 with a Service Re-Authorization, and including the Quota used and a VSA that specifies a re-authorization reason, such as Primary Quota Consumed. In response, AAA Server 130 provides an Access-Accept message that contains a Quota value and an Idle-Timeout value in one of five (5) combinations:

1. Quota=0, don't open (close) connection
2. Quota>0, open connection
3. Quota>0, Idle-Timeout>0, open connection and start idle timer
4. Quota=0, Idle-Timeout>0 open connection but block/redirect traffic
5. Quota=0, Idle-Timeout=0, open connection and wait for traffic Expiration of the Idle-Timeout value is processed in block 614. The Idle-Timeout value expires when a user has not communicated traffic for a particular service for the amount of time specified by the Idle-Timeout value. In response, SSG 114 sends a Service Re-Authorization Access-Request message to AAA Server 130, including the actual Quota used and a VSA that specifies a reason for re-authorization as Idle-Timeout Expired. AAA Server 130 provides an Access-Accept message that contains a Quota value and an Idle-Timeout value in one of five (5) combinations:

1. Quota=0, do not open (close) connection
2. Quota>0, open connection
3. Quota>0, Idle-Timeout>0, open connection and start idle timer
4. Quota=0, Idle-Timeout>0 open connection but block/redirect traffic
5. Quota=0, Idle-Timeout=0, open connection and wait for traffic If the user does not have additional quota in the user's account, then the Billing Server 132 does not respond with Quota equal to zero. The SSG 114 understands such a response as instructing it to drop or redirect traffic on the associated connection. Therefore, in general traffic on the connection is redirected to the portal in which the user is prompted to replenish the quota.

In one embodiment, the Idle-Timeout feature described above applies to volume based pre-paid connections, whereas redirection also applies to time-based connections. Thus, for an authorization or re-authorization request, the Billing Server 132 can respond answer with one of the following combinations of values, if the user does not have quota value left:

1. Quota=0, do not open (close) connection
2. Quota=0, Idle-Timeout>0, open connection but block/redirect traffic For the first type of response that specifies Quota as zero, the connection is terminated. For the second type of response the user's traffic is redirected to the portal, if the service is configured for redirection. If redirection is not configured, then the user's traffic is dropped, and the connection is re-authorized again only after a period of time equal to the Idle Timeout value passes.

Table 13 below provides a summary of actions that are performed by SSG 114 as a result of the attributes that are included into an Access-Accept message from AAA Server 130 in response to a Service Authorization and Service Re-Authorization. Table 13 also describes the conditions under which SSG 114 re-authorizes a connection, and the traffic status during the re-authorization period.

TABLE 13

SUMMARY OF CONDITIONS AND ACTIONS

| Authorization Or Re-Authorization Response | Action by SSG 114 | Condition for Re-Authorization | Connection State During Re-Authorization | Reason and Quota sent During Re-Authorization |
|---|---|---|---|---|
| Quota = 0 | Close Connection | — | — | — |

TABLE 13-continued

SUMMARY OF CONDITIONS AND ACTIONS

| Authorization Or Re-Authorization Response | Action by SSG 114 | Condition for Re-Authorization | Connection State During Re-Authorization | Reason and Quota sent During Re-Authorization |
|---|---|---|---|---|
| Quota > 0 (Or) Quota > 0 & Idle-Time = 0 | Open Connection Forward Traffic | Quota Consumed | Forward/Drop the traffic | R(eason) = Quota Consumed Q(uota) = Byte count of Connection |
| Quota > 0 & Idle-Time > 0 | Open Connection Forward Traffic Start Idle Timer | Quota Consumed | Forward/Drop the Traffic | R = Quota Consumed Q = Byte count of Connection |
|  |  | Idle Timer Expired | Forward/Drop the Traffic | R = Idle-Timer Expired Q = Byte count of Connection |
| Quota = 0 & Idle-Time > 0 | Open Connection Drop/Re-Direct Traffic Start Re-Authorization Timer | Re-Authorization Timer Expired | Drop/Redirect the Traffic | R = Quota Consumed Q = Byte count of Connection |
| Quota = 0 & Idle-Time = 0 | Open Connection Wait for Traffic | For the next first data packet on that connection | Forward/Drop the Traffic | R = Quota Consumed Q = Byte count of Connection |

3.3 Refilling Quotas

Subscribers may need to be able to refill their credit balances at any time. Accordingly, one embodiment provides portal pages to which a mobile device of a user is redirected when the user is running out of credit. Alternatively, a user can load such portal pages at any time that the user wishes to add credit to an account balance. When users attempt to use a service that is disconnected, the SSG service redirect feature pushes them to a Web page that allows them to refill their balance and to reconnect to the service.

Figure 5B:
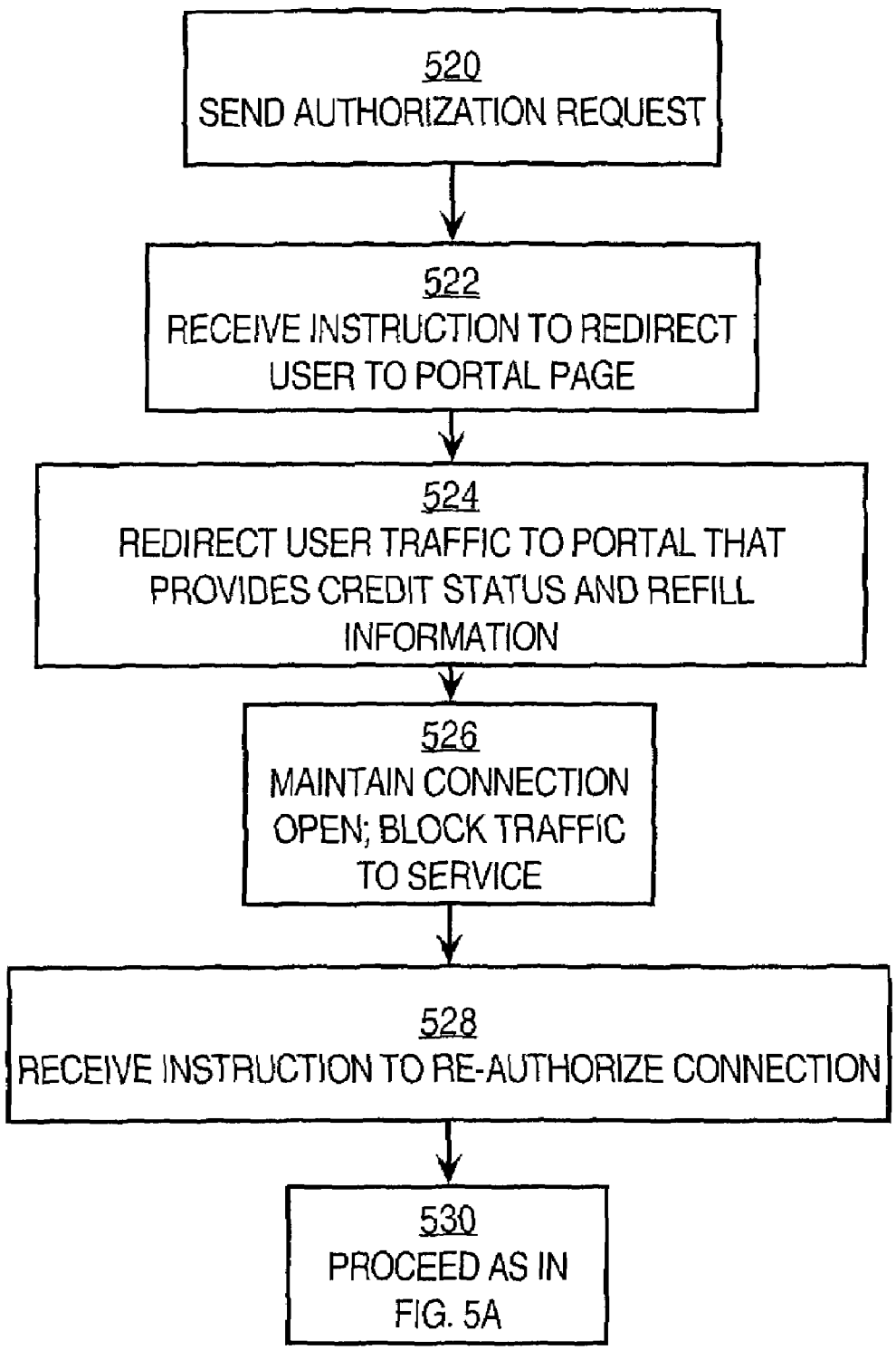
FIG. 5B is a flow diagram providing a high-level overview of a process of refilling quotas.

FIG. 5B is a flow diagram providing a high-level overview of a process of refilling quotas. In block 520, an authorization request is sent. For example, SSG 114 sends an authorization request or re-authorization request to Billing Server 132 when a user logs on to a prepaid service, or upon exhaustion of an allotted quota, respectively. In block 522, an instruction to redirect user traffic to a portal page is received. For example, if the Billing Server 132 detects that credit has exhausted or gone below a threshold for this user, the Billing Server instructs the SSG 114 to redirect user traffic on the connection to a designated web portal.

In block 524, user traffic is redirected to the specified portal. For example, SSG 114 starts redirecting the user's TCP traffic to a network address associated with the portal. A server at the network address for the portal provides one or more Web pages that are compatible with mobile devices. The pages provide an application that informs the user about the user's credit status and how the user can refill his credit. During the period of redirection, the user connection is maintained, but user traffic for the connected service is blocked, as indicated in block 526.

In one embodiment, when mobile station 102 accesses the Dashboard 112 page, either forced by the SSG or selected by the user, the Dashboard 112 provides a Show Account Information button and a Refill Credit Balance button in a page displayed in the mobile device. Because the Dashboard 112 has already authenticated the user during the account logon phase, the user does not necessarily need to authenticate with a username and password or PIN. However, as an option, the Dashboard 112 can require the user to re-authenticate.

When the Show Account Information button is selected, the Dashboard 112 queries the Billing Server 132 for the current credit balance for the mobile station 102. The Billing Server 132 replies with the requested data to Dashboard 112. When the user selects the Refill Credit Balance button, the Dashboard 112 queries the Billing Server 132 to retrieve the current balance of the mobile station 102. An additional field allows the user to enter the prepaid card number and the corresponding PIN. After validation with a prepaid system, the Billing Server 132 updates the current balance and returns the new value in the account information field for the user.

It is assumed that the user replenishes his credit. Thereafter, as indicated by block 528, an instruction to re-authorize the connection is received. Thus, SSG 114 may block the user's traffic to the service and upon credit refill, the Billing Server 132 instructs the SSG to re-authorize the connection. Upon successful re-authorization, as indicated in block 530, the user is allotted a new quota portion, and SSG 114 monitors the user's traffic as described above with respect to FIG. 5A. As a result, online refilling of credit is performed without disconnection or requiring the user to log in to the services again.

SSG 114 may be configured to provide such redirection by an administrator issuing appropriate known configuration commands. In one approach, configuration commands can establish redirection to a single pre-paid portal for all pre-paid users on the SSG 114. In this approach all pre-paid user traffic is redirected to a designated group of servers. With multiple servers configured under the group, users are re-directed to a particular server in round-robin fashion. In another approach, all pre-paid users connected to a particular service can be redirected to a specific portal.

3.5 Processing upon Connection Termination

Upon termination of an account, such as when a user logs off a service and un-consumed quota value is received, or when an Accounting Stop message is received from the GGSN, all held quotas are returned. When the SSG 114 receives information indicating an account logoff (user logoff), the SSG 114 automatically destroys the connection objects for all services to which the logged-off user is connected. Separate Accounting Stop messages are then generated for each terminated service and are forwarded to the AAA server.

3.6 Summary of Beneficial Features of Certain Embodiments

Thus, method and apparatus providing prepaid billing for network services using explicit service authorization in an access server has been described. Certain embodiments are interoperable with equipment from any GGSN vendor and provide standard interfaces and standard protocols. In another embodiment, a user can simultaneously connect to multiple services that can be charged individually by any prepaid billing model. In still another embodiment, access to concurrent prepaid services is enabled within one PDP context. Through the Dashboard 112, users can online-query the status of a session (which shows the services to which a subscriber is logged on to), the status of the connection, the current balance, and system messages from the SSG 114. The user's PDP context can be held up if desired, so the user's call is not terminated for any apparent reason to the user. Users can online display and refill their credit balances, and micro payments are supported Currently, mobile handsets support only a limited number of access-point names (APNs). Moreover, if users want to connect to multiple APNs, they must first disconnect from the APN in use before establishing a connection to a different APN. With SSG, users can have multiple services active within a single PDP context at the same time. Mobile service providers can therefore make more money in the same time using the same radio infrastructure by offering simultaneous services, each billed by a different billing schema.

Through the SESM, while online, mobile users can query the status of a session (which shows the services to which a subscriber is logged on to), the status of the connection, the current balance, and system messages from the SSG. This service is free of charge and is accessed through the SESM on the default network. Every service on the default network is by definition "free of charge." Because within GPRS, the GSM network is connected directly to the network, GPRS subscribers are logged on to the network in an always-on mode. When no service is in use, the default network area is defined as the "service area."

The user's PDP context can be held up if desired, so the user's call is not terminated for any apparent reason to the user. Treating the service connection as a separate entity from the PDP context enables informing the user of what is happening. Querying SESM through Enterprise Java Beans is an advantage for the user because the PDP context is not disconnected on balance depletion; only the service is disconnected. Thus, independent of their credit balance, users can always connect to the default network where the SESM resides to find out their current user balance or to refill the current balance. In addition, the rating engine can trigger an SMS Gateway to notify the user about the current status of the user balance.

By integrating the prepaid service into the SESM, several functions can be incorporated, including user balance query or user account refills. Integration also allows multiple GGSN PDP contexts to be simultaneously billed prepaid, because the balance is not held in a network element when a call is active. Billing models other than time and data are possible. Users can terminate an SSG service session from an application based on some other criteria; for example, when a music clip is ended. This behavior is possible because the application sends an application stop message to the SESM, which then can stop the service by sending an accounting stop to the SSG.

The SSG prepaid billing solution offers the benefits of real-time billing per service, online display and refilling of credit balances, concurrent service access, and micro payments, as detailed below.

The prepaid billing solution allows for real-time billing with maximum flexibility, regardless of the type of service and billing scheme; that is, users are billed based on a flat rate, air time, or volume (usage based). The solution does not rely on IN infrastructure; instead, billing can be extended on the application level (Layer 4 to Layer 7) for content-based services. The prepaid billing solution for packet data must integrate common prepaid solutions as they exist today for voice prepaid and circuit-switched data. Standard interfaces and protocols must be used. With prepaid billing systems, SSG can communicate by means of the RADIUS protocol.

Subscribers need to be able to refill their credit balances at any time. Portal pages are provided to which users are redirected once they are running out of credit (forced redirect) or at any time users feel the credit needs to be refilled after checking their current balance. Because the SESM is located in the default network, users are not charged for this service.

When users attempt to use a service that is disconnected, the SSG service redirect feature pushes them to a Web page that allows them to refill their balance and to reconnect to the service. When the user accesses the SESM page, either forced by the SSG or selected by the user, the SESM page includes a Show Account Information button and a Refill Credit Balance button. Selecting the Show Account Information button causes the SSG to generate a page that shows account information for the current user. Selecting the Refill Credit Balance button causes the SSG to initiate a user dialog in which the user can refill the credit balance.

In these operations, because the SESM has already authenticated the user during the account logon phase, the user does not need to authenticate with a username/password (PIN). However, as an option, the SESM can require the user to re-authenticate. The billing information can be stored in a relational database, a directory, a RADIUS server, or any other storage that an SESM application can query.

When the Show Account Information button is selected, the SESM queries the balance server for the current credit balance for the user. The balance server replies with the requested data to SESM. When the Refill Credit button is selected, the SESM queries the balance server to retrieve the current balance of the user. An additional field allows the user to enter the prepaid card number and the corresponding PIN. After validation with a prepaid system, the balance server updates the current balance and returns the new value in the account information field for the user.

The SSG prepaid solution is capable of supporting concurrent service access within one PDP context. Mobile operators want to be able to access any service through a single PDP context. This kind of access saves resources in the mobile infrastructure and also overcomes current limitations of handsets.

SSG services can be configured for concurrent or sequential access. Concurrent access allows users to log on to this service while being simultaneously connected to other services. Sequential access requires that the user log off from all other services before accessing a service configured for sequential access. The service mode defined in the Cisco Service-Info vendor-specific attribute (VSA) determines whether the user can simultaneously log on to this service and connect to other services or whether the user cannot access any other services while using this service.

Users want to be able to make micro payments while an account is running. After checking the current credit balance, the SESM can charge any service at any time to the user's prepaid account. Before a transaction takes place, users must identify themselves by typing a username and password (PIN) to proceed with the deduction of the credit balance.

4.0 Implementation Mechanisms—Hardware Overview

Figure 7:
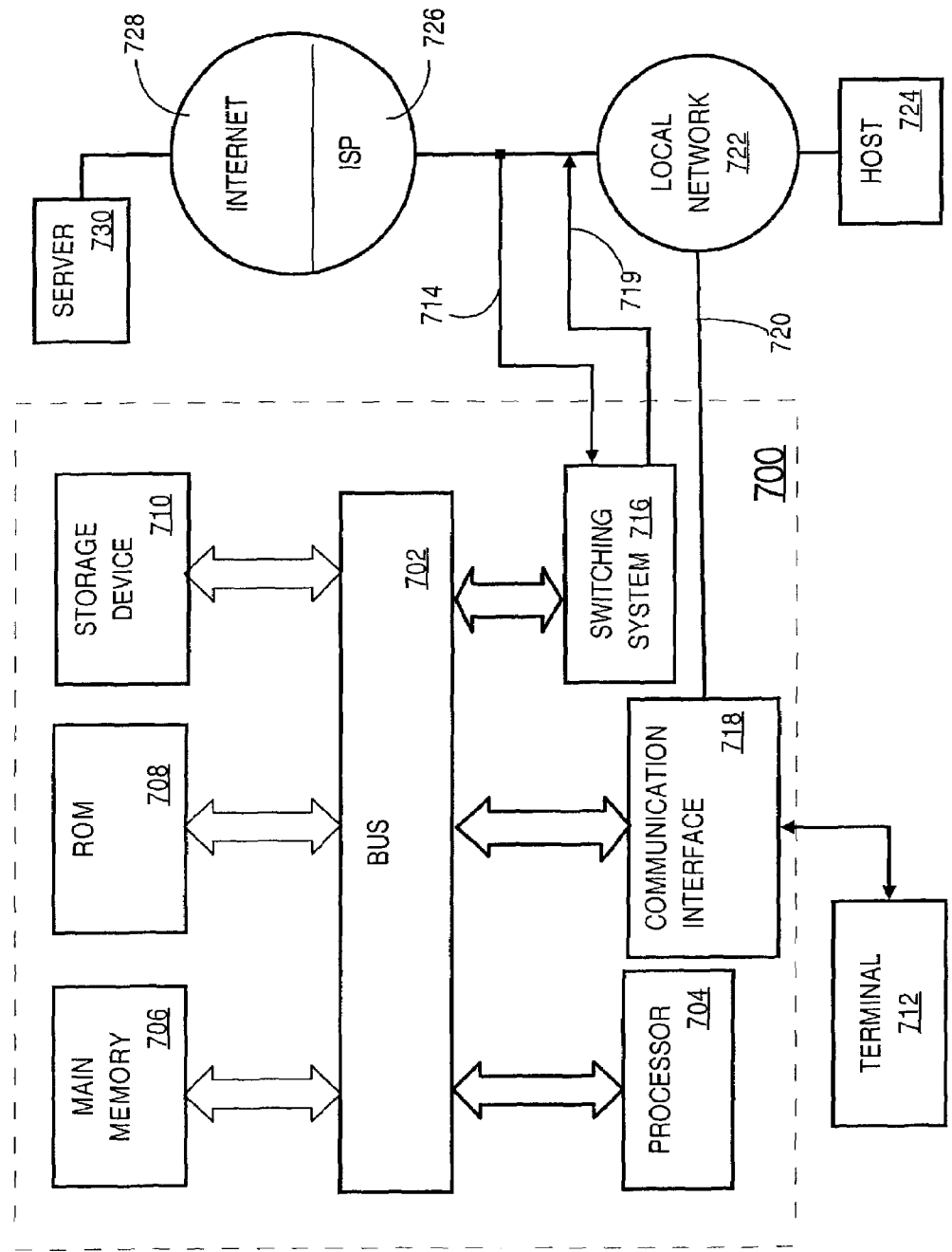
FIG. 7 is a block diagram that illustrates a computer system upon which an embodiment may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory ("RAM") or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory ("ROM") 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube ("CRT"), for displaying information to a computer user. An input device 714, including alphanumeric and other keys, is coupled to bus 702 for communicating information and command selections to processor 704. Another type of user input device is cursor control 716, such as a mouse, trackball, stylus, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for prepaid billing for network services using explicit service authorization and subsequent re-authorization in an access server. According to one embodiment of the invention, prepaid billing for network services using explicit service authorization and subsequent re-authorization in an access server is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector can receive the data carried in the infrared signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 integrated services digital network ("ISDN") card or a modem to provide a data communication connection to a corresponding type of telephone line. As another example, communication interface 718 may be a local area network ("LAN") card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider ("ISP") 726. ISP 726 in turn provides data communication services through the worldwide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for prepaid billing for network services using explicit service authorization and subsequent re-authorization in an access server as described herein.

Processor 704 may execute the received code as it is received, and/or stored in storage device 710, or other non-volatile storage for later execution. In this manner, computer system 700 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

Certain embodiments offer various improvements over prior approaches, although not all such improvements are required in an embodiment. For example, currently, mobile handsets support only a limited number of access-point names (APNs). Moreover, if a user wants to connect to multiple APNs, the user must first disconnect from the current APN before establishing a connection to a different APN. With SSG, users can have multiple services active within a single PDP context at the same time. Mobile Service Providers can therefore make more money in the same time using the same radio infrastructure by offering simultaneous services, each billed by a different billing schema.

Through the Dashboard 112, users can online-query the status of a session, which shows the services to which a subscriber is logged on, the status of the connection, the current balance, and system messages from the SSG. This service is typically free of charge and is accessed through the Dashboard 112 on the default network. Every service on the default network is by definition "free of charge." Because within GPRS, the GSM network is connected directly to the network, GPRS subscribers are logged on to the network in an always-on mode. When no service is in use, the default network area is defined as the "service area."

The user's PDP context can be held up if desired, so the user's call is not terminated for any apparent reason to the user. Treating the service connection as a separate entity from the PDP context has many advantages, but the main one is that the user can be informed of what is happening. Querying Dashboard 112 is an advantage for the user because the PDP context is not disconnected on balance depletion; only the service is disconnected. Independent of their credit balance, users can always connect to the default where the Dashboard 112 resides to find out their current user balance or to refill the current balance. In addition, the rating engine can trigger an SMS Gateway to notify the user about the current status of the user balance.

By integrating the prepaid service into the Dashboard 112, several functions can be incorporated, including user balance query or user account refills. Integration also allows multiple GGSN PDP contexts to be simultaneously billed prepaid, because the balance is not network element (IN) when a call is active.

Billing models other than time and data are possible. Users can terminate an SSG session from an application based on some other criteria; for example, when a music clip is ended. This behavior is possible because the application sends an application stop to the Dashboard 112, which then can stop the service by sending an accounting stop to the SSG.

A certain embodiment may combine the function of the SSG with the gateway support node whereby the defined protocol interfaces between the gateway support node and the SSG become internal primitives within the software module running on a common router platform.

APPENDIX A

SSG RADIUS Accounting Records

This appendix describes events that generate RADIUS accounting records and the attributes associated with the accounting records sent from the NRP-SSG to the accounting server. The events include Account Logon, Account Logoff, Connection Start, Connection Stop, and Radius Interim Accounting per service.

1. Account Logon

When a user logs on, the NRP-SSG sends a RADIUS accounting request on behalf of the user to the accounting server. The following table lists the attributes associated with this record.

| | |
|---|---|
| NAS-IP-Address | IP address of the NRP-SSG |
| NAS-Port | 0 |
| NAS-Port-Type | Virtual |
| User-Name | User name for log in to SSG |
| Acct-Status-Type | Start |
| Acct-Authentic | RADIUS |
| Service-Type | Framed |
| Acct-Session-Id | Session number |
| Framed-Protocol | PPP |
| Framed-IP-Address | IP address of the user's system |
| Acct-Delay-Time | 0 |

Example:
    NAS-IP-Address=172.16.11.1
    NAS-Port=0
    NAS-Port-Type=Virtual
    User-Name="name"
    Acct-Status-Type=Start
    Acct-Authentic=RADIUS
    Service-Type=Framed
    Acct-Session-Id="00000011"
    Framed-Protocol=PPP
    Framed-IP-Address=172.16.11.112
    Acct-Delay-Time=0

2. Account Logoff

When a user logs off, the NRP-SSG sends a RADIUS accounting request on behalf of the user to the accounting server. The following table lists the attributes associated with this record.

| | |
|---|---|
| NAS-IP-Address | IP address of the NRP-SSG |
| NAS-Port | 0 |

-continued

| | |
|---|---|
| NAS-Port-Type | Virtual |
| User-Name | Name used to log on to the service provider network |
| Acct-Status-Type | Stop |
| Acct-Authentic | RADIUS |
| Service-Type | Framed |
| Acct-Session-Id | Session number |
| Acct-Terminate-Cause | Cause of account termination: User-Request, Session-Timeout, Idle-Timeout, Lost-Carrier, Lost-Service |
| Acct-Session-Time | Length of session in seconds |
| Acct-Input-Octets | Number of inbound bytes |
| Acct-Output-Octets | Number of outbound bytes |
| Acct-Input-Packets | Number of inbound packets |
| Acct-Output-Packets | Number of outbound packets |
| Framed-Protocol | PPP |
| Framed-IP-Address | IP address of the user's system |
| Control-Info (I) | Downstream in byte count high/low 32 bits |
| Control-Info (O) | Upstream in byte count high/low 32 bits |
| Acct-Delay-Time | 0 |

Example:
NAS-IP-Address=172.16.11.1
  NAS-Port=0
  NAS-Port-Type=Virtual
  User-Name="name"
  Acct-Status-Type=Stop
  Acct-Authentic=RADIUS
  Service-Type=Framed
  Acct-Session-Id="00000000"
  Acct-Terminate-Cause=
  Acct-Session-Time=77
  Acct-Input-Octets=0
  Acct-Output-Octets=0
  Acct-Input-Packets=0
  Acct-Output-Packets=0
  Framed-Protocol=PPP
  Framed-IP-Address=172.16.11.112
  Control-Info="I0;0"
  Control-Info="O0;0"
  Acct-Delay-Time=0

3. Connection Start

When a user accesses a service, the NRP-SSG sends a RADIUS accounting request to the accounting server. The following table lists the attributes associated with this record.

| | |
|---|---|
| NAS-IP-Address | IP address of the NRP-SSG |
| NAS-Port | 0 |
| NAS-Port-Type | Virtual |
| User-Name | Login name for SSG or login name for service if it is proxy type service |
| Acct-Status-Type | Start |
| Acct-Authentic | RADIUS |
| Service-Type | Framed |
| Acct-Session-Id | Session number |
| Framed-Protocol | PPP |
| Service-Info | Cisco Vendor Specific Attribute, see Appendix B for options |
| Acct-Delay-Time | 0 |

Example:
NAS-IP-Address=172.16.11.1
  NAS-Port=0
  NAS-Port-Type=Virtual
  User-Name="name"
  Acct-Status-Type=Start
  Acct-Authentic=RADIUS
  Service-Type=Framed
  Acct-Session-Id="00000012"
  Framed-Protocol=PPP
  Service-Info="Nservice.com" //service name
  Service-Info="Uname" //login name for that service
  Service-Info="TX"
  Acct-Delay-Time=0

4. Connection Stop

When a user terminates a service, the NRP-SSG sends a RADIUS accounting request to the accounting server. The following table lists the attributes associated with this record.

| | |
|---|---|
| NAS-IP-Address | IP address of the NRP-SSG |
| NAS-Port | 0 |
| NAS-Port-Type | Virtual |
| User-Name | Login name for SSG or login name for service if it is proxy type service |
| Acct-Status-Type | Stop |
| Acct-Authentic | RADIUS |
| Service-Type | Framed |
| Acct-Session-Id | Session number |
| Acct-Terminate-Cause | Cause of account termination: User-Request, Session-Timeout, Idle-Timeout, Lost-Carrier, Lost-Service |
| Acct-Session-Time | Length of session in seconds |
| Acct-Input-Octets | Number of inbound bytes |
| Acct-Output-Octets | Number of outbound bytes |
| Acct-Input-Packets | Number of inbound packets |
| Acct-Output-Packets | Number of outbound bytes |
| Framed-Protocol | PPP |
| Control-Info | (I)Downstream/(O)Upstream in byte count high/low 32 bits |
| Service-Info | Cisco Vendor Specific Attribute, see Appendix B for options |
| Acct-Delay-Time | 0 |

Example:
NAS-IP-Address=172.16.11.1
  NAS-Port=0
  NAS-Port-Type=Virtual
  User-Name="name"
  Acct-Status-Type=Stop
  Acct-Authentic=RADIUS
  Service-Type=Framed
  Acct-Session-Id="00000012"
  Acct-Terminate-Cause=User-Request
  Acct-Session-Time=8
  Acct-Input-Octets=0
  Acct-Output-Octets=0
  Acct-Input-Packets=0
  Acct-Output-Packets=0
  Framed-Protocol=PPP
  Control-Info="I0;0"
  Control-Info="O0;0"
  Service-Info="Nservice.com"
  Service-Info="Uname"
  Service-Info="TX"
  Acct-Delay-Time=0

5. Radius Interim Accounting per Service

When a user logs on, the SSG sends an accounting start request on behalf of the user. Then, the SSG periodically sends interim accounting updates during the session; the ssg accounting interval [sec] command controls the account update interval. The following table lists the attributes associated with this record.

| | |
|---|---|
| NAS-IP-Address | IP address of the NRP-SSG |
| NAS-Port | 0 |
| NAS-Port-Type | Virtual |
| User-Name | Login name for SSG |
| Acct-Status-Type | Update |
| Acct-Authentic | RADIUS |
| Service-Type | Framed |
| Acct-Session-Id | Session number |
| Acct-Session-Time | Length of session in seconds |
| Acct-Input-Octets | Number of inbound bytes |
| Acct-Output-Octets | Number of outbound bytes |
| Acct-Input-Packets | Number of inbound packets |
| Acct-Output-Packets | Number of outbound packets |
| Framed-Protocol | PPP |
| Framed-IP-Address | IP address of the user's system |
| Control-Info | (I)Downstream/(O)Upstream in byte count high/low 32 bits |
| Acct-Delay-Time | 0 |

Example:
  NAS-IP-Address=172.16.11.1
    NAS-Port=0
    NAS-Port-Type=Virtual
    User-Name="name"
    Acct-Status-Type=Update
    Acct-Authentic=RADIUS
    Service-Type=Framed
    Acct-Session-Id="00000000"
    Acct-Session-Time=77
  Acct-Input-Octets=0
    Acct-Output-Octets=0
    Acct-Input-Packets=0
    Acct-Output-Packets=0
    Framed-Protocol=PPP
    Framed-IP-Address=172.16.11.112
    Control-Info="I0;0"
    Control-Info="O0;0"
    Acct-Delay-Time=0

Connection Update

| | |
|---|---|
| NAS-IP-Address | IP address of the NRP-SSG |
| NAS-Port | 0 |
| NAS-Port-Type | Virtual |
| User-Name | Login name for SSG or login name for service if it is proxy type service |
| Acct-Status-Type | Update |
| Acct-Authentic | RADIUS |
| Service-Type | Framed |
| Acct-Session-Id | Session number |
| Acct-Session-Time | Length of session in seconds |
| Acct-Input-Octets | Number of inbound bytes |
| Acct-Output-Octets | Number of outbound bytes |
| Acct-Input-Packets | Number of inbound packets |
| Acct-Output-Packets | Number of outbound packets |
| Framed-Protocol | PPP |
| Control-Info | (I)Downstream/(O)Upstream in byte count high/low 32 bits |
| Service-Info | Cisco Vendor Specific Attribute, see Appendix B for options |
| Acct-Delay-Time | 0 |

Example:
  NAS-IP-Address=172.16.11.1
    NAS-Port=0
    NAS-Port-Type=Virtual
    User-Name="name"
    Acct-Status-Type=Update
    Acct-Authentic=RADIUS
    Service-Type=Framed
    Acct-Session-Id="00000012"
    Acct-Session-Time=8
    Acct-Input-Octets=0
    Acct-Output-Octets=0
    Acct-Input-Packets=0
    Acct-Output-Packets=0
    Framed-Protocol=PPP
    Control-Info="I0;0"
    Control-Info="O0;0"
    Service-Info="Nservice.com"
    Service-Info="Uname"
    Service-Info="TX"
    Acct-Delay-Time=0

APPENDIX B

SSG Vendor-Specific Attributes

This appendix describes the vendor-specific attributes (VSAs) that the SSG can act on. The following table lists the VSAs that are defined for the SSG. These attributes are specific to Cisco; that is, the vendor ID is Cisco ID 9.

| AttrID | VendorID | SubAttrID | SubAttrName | SubAttrDataType |
|---|---|---|---|---|
| 26 | 9 | 1 | VPDN-Info | String |
| 26 | 9 | 250 | Account-Info | String |
| 26 | 9 | 251 | Service-Info | String |
| 26 | 9 | 252 | Command-Code | Binary |
| 26 | 9 | 253 | Control-Info | String |

The following sections define the format of the value for each subattribute.

1 Format for VPDN-Info

The format for VPDN-Info is the same as the format defined by Cisco IOS:
vpdn:ip-addresses=<home gateway ips> (IPs are separated by ' ' or ',')
vpdn:gw-password=<home gateway password>
vpdn:nas-password=<NAS password>
vpdn:tunnel-id=<tunnel id>
vpdn:tunnel-type=<type>
ip:inacl=<listnum/name/command>
ip:outacl=<listnum/name/command>

2 Format for Account-Info
Account-Info includes Auto Logon Service, Default Internet Access, Messaging IP and Port, Service Name, Status Query Interval, and Subscriber IP.

2.1 Auto Logon Service code: 250, 'A'
len: 3

```
+-+-+-+-+-+-+-+-+-+-+-+
|a|b|   c   |d|e|f|g|
+-+-+-+-+-+-+-+-+-+-+-+
``` a = 26        (Radius attr for vendor specific)
b = len      (length of the Radius Vendor specific Attribute>
c = 9         (Cisco vendor ID)

2  Format for Account-Info
Account-Info includes Auto Logon Service, Default Internet Access, Messaging IP and Port, Service Name, Status Query Interval, and Subscriber IP.

d = 250       (Sub attribute ID for Account-Info)
e = len       (length of the vendor specific sub attribute)
f = 'A'       (account-info code for Auto log on service)
g = <service namer[;user;password]>

2.2  Default Internet Access code: 250, 'D'
len: 4

```
+-+-+-+-+-+-+-+-+-+-+-+
|a|b|    c   |d|e|f|g|
+-+-+-+-+-+-+-+-+-+-+-+
``` a = 26        (Radius attr for vendor specific)
b = len       (length of the Radius Vendor specific Attribute>
c = 9         (Cisco vendor ID)
d = 250       (Sub attribute ID for Account-Info)
e = len       (length of the vendor specific sub attribute)
f = 'D'       (account-info code for default Internet Access)
g = 'D'/'E'   (disable or enable default Internet Access)

2.3  Messaging IP and Port code: 250, 'M'
len: >7

```
+-+-+-+-+-+-+-+-+-+-+-+-+-+-+....+-+-+-+
|a|b|    c   |d|e|f|      g           |
+-+-+-+-+-+-+-+-+-+-+-+-+-+-+....+-+-+-+
``` a = 26        (Radius attr for vendor specific)
b = len       (length of the Radius Vendor specific Attribute>
c = 9         (Cisco vendor ID)
d = 250       (Sub attribute ID for Account-Info)
e = len       (length of the vendor specific sub attribute)
f = 'M'       (account-info code for messaging ip and port)
g = <ip:port> ip is in dot notation

2.4  Service Name code: 250, 'N'
len: >6

```
+-+-+-+-+-+-+-+-+-+-+-+-+-+-+....+-+-+-+
|a|b|    c   |d|e|f|      g           |
+-+-+-+-+-+-+-+-+-+-+-+-+-+-+....+-+-+-+
``` a = 26        (Radius attr for vendor specific)
b = len       (length of the Radius Vendor specific Attribute>
c = 9         (Cisco vendor ID)
d = 250       (Sub attribute ID for Account-Info)
e = len       (length of the vendor specific sub attribute)
f = 'N'       (account-info code for service name)
for account info reply:
g = <name;description;flag>
(the flag is 'P', 'X' or 'T' representing the service type)
for account ping reply:
g = <[1|0]name;elapsed time;service username>

2.5  Status Query Interval code: 250, 'P'
len: >6

```
+-+-+-+-+-+-+-+-+-+-+-+-+-+-+....+-+-+-+
|a|b|    c   |d|e|f|      g           |
+-+-+-+-+-+-+-+-+-+-+-+-+-+-+....+-+-+-+
``` a = 26        (Radius attr for vendor specific)
b = len       (length of the Radius Vendor specific Attribute>
c = 9         (Cisco vendor ID)
d = 250       (Sub attribute ID for Account-Info)
e = len       (length of the vendor specific sub attribute)
f = 'P'       (account-info code for Status Query Interval)
g = <seconds as a string>

2  Format for Account-Info
Account-Info includes Auto Logon Service, Default Internet Access, Messaging IP and Port, Service Name, Status Query Interval, and Subscriber IP.

2.6  Subscriber IP code: 250, 'S'
len: >6

```
+-+-+-+-+-+-+-+-+-+-+-+-+-+-+....+-+-+-+
|a|b|    c   |d|e|f|      g           |
+-+-+-+-+-+-+-+-+-+-+-+-+-+-+....+-+-+-+
``` a = 26        (Radius attr for vendor specific)
b = len       (length of the Radius Vendor specific Attribute>
c = 9         (Cisco vendor ID)
d = 250       (Sub attribute ID for Account-Info)
e = len       (length of the vendor specific sub attribute)
f = 'S'       (account-info code for subscriber IP)
g = <subscriber's IP in dot notation>

3  Format for Service-Info
Service-Info includes PPP Authentication Type, DNS Server Address, Service Next Hop Gateway, Service Mode, Destination Network, Service Domain, IP Precedence Bits, RADIUS Server, Service Type, Service User Name, Service-Defined Cookie for Proxy RADIUS, and Enable Full Username for Proxy RADIUS.

3.1  PPP Authentication Type code: 251, 'A'
len: 4

```
+-+-+-+-+-+-+-+-+-+-+-+
|a|b|    c   |d|e|f|g|
+-+-+-+-+-+-+-+-+-+-+-+
``` a = 26        (Radius attr for vendor specific)
b = len       (length of the Radius Vendor specific Attribute>
c = 9         (Cisco vendor ID)
d = 251       (Sub attribute ID for Service-Info)
e = len       (length of the vendor specific sub attribute)
f = 'A'       (service-info code for PPP Authentication Type)
g = 'P'/'C'   (PAP or CHAP)

3.2  DNS Server Address code: 251, 'D'
len: >7

```
+-+-+-+-+-+-+-+-+-+-+-+-+-+-+...+
|a|b|    c   |d|e|f|     g      |
+-+-+-+-+-+-+-+-+-+-+-+-+-+-+...+
``` a = 26        (Radius attr for vendor specific)
b = len       (length of the Radius Vendor specific Attribute>
c = 9         (Cisco vendor ID)
d = 251       (Sub attribute ID for Service-Info)
e = len       (length of the vendor specific sub attribute)
f = 'D'       (service-info code for service DNS)
g = <ip1[;ip2]>  (IP of the Primary/Secondary DNS servers in dot notation)

3.3  Service Next Hop Gateway code: 251, 'G'
len: > 7

```
+-+-+-+-+-+-+-+-+-+-+-+-+-+-+...+
|a|b|    c   |d|e|f|     g      |
+-+-+-+-+-+-+-+-+-+-+-+-+-+-+...+
```

-continued

3 Format for Service-Info
Service-Info includes PPP Authentication Type, DNS Server Address,
Service Next Hop Gateway, Service Mode, Destination Network, Service
Domain, IP Precedence Bits, RADIUS Server, Service Type, Service
User Name, Service-Defined Cookie for Proxy RADIUS, and Enable
Full Username for Proxy RADIUS.

```
a = 26            (Radius attr for vendor specific)
b = len           (length of the Radius Vendor specific Attribute>
c = 9             (Cisco vendor ID)
d = 251           (Sub attribute ID for Service-Info)
e = len           (length of the vendor specific sub attribute)
f = 'G'           (service-info code for service next hop gateway)
g = <IP in dot dotation or service name>
Note: Service name will be resolved to IP from the next hop table.
```
3.4  Service Mode code: 251, 'M'
len: 4

```
+-+-+-+-+-+-+-+-+-+-+-+-+
|a|b|    c    |d|e|f|g|
+-+-+-+-+-+-+-+-+-+-+-+-+
```

```
a = 26            (Radius attr for vendor specific)
b = len           (length of the Radius Vendor specific Attribute>
c = 9             (Cisco vendor ID)
d = 251           (Sub attribute ID for Service-Info)
e = len           (length of the vendor specific sub attribute)
f = 'M'           (service-info code for service mode)
g = 'S'/'C'/'E'   (Sequential, Concurrent or Exclusive)
```
3.5  Destination Network code: 251, 'R'
len: >12

```
+-+-+-+-+-+-+-+-+-+-+-+-+-+...-+
|a|b|    c    |d|e|f|    g     |
+-+-+-+-+-+-+-+-+-+-+-+-+-+...-+
```

```
a = 26            (Radius attr for vendor specific)
b = len           (length of the Radius Vendor specific Attribute>
c = 9             (Cisco vendor ID)
d = 251           (Sub attribute ID for Service-Info)
e = len           (length of the vendor specific sub attribute)
f = 'R'           (service-info code for destination network)
g = <ip;mask[;flag]>
(ip and mask are in dot notations, flag can be 'I' for INCLUDED or 'E' for
EXCLUDED; flag is default to 'I')
Note: Within one RADIUS packet, there might be multiple instances of
Service-Info subattributes for the destination network.
```
3.6  Service Domain code: 251, 'O'
len: >4

```
+-+-+-+-+-+-+-+-+-+-+-+-+-+-+....-+-+-+
|a|b|    c    |d|e|f|       g         |
+-+-+-+-+-+-+-+-+-+-+-+-+-+-+....-+-+-+
```

```
a = 26            (Radius attr for vendor specific)
b = len           (length of the Radius Vendor specific Attribute>
c = 9             (Cisco vendor ID)
d = 251           (Sub attribute ID for Service-Info)
e = len           (length of the vendor specific sub attribute)
f = 'O'           (service-info code for domain name)
g = <domain name[;domain name[;...]]> (domain name or names
separated by semicolon)
```
3.7  IP Precedence Bits code: 251, 'Q'
len: 4

```
+-+-+-+-+-+-+-+-+-+-+-+-+
|a|b|    c    |d|e|f|g|
+-+-+-+-+-+-+-+-+-+-+-+-+
```

-continued

3 Format for Service-Info
Service-Info includes PPP Authentication Type, DNS Server Address,
Service Next Hop Gateway, Service Mode, Destination Network, Service
Domain, IP Precedence Bits, RADIUS Server, Service Type, Service
User Name, Service-Defined Cookie for Proxy RADIUS, and Enable
Full Username for Proxy RADIUS.

```
a = 26            (Radius attr for vendor specific)
b = len           (length of the Radius Vendor specific Attribute>
c = 9             (Cisco vendor ID)
d = 251           (Sub attribute ID for Service-Info)
e = len           (length of the vendor specific sub attribute)
f = 'Q'           (service-info code for IP Precedence Bits);
g = '0'-'7'       (0-7 will be mapped into Type of Service in IP)
```
3.8  Radius Server code: 251, 'S'
len: >7

```
+-+-+-+-+-+-+-+-+-+-+-+-+-+...-+
|a|b|    c    |d|e|f|    g     |
+-+-+-+-+-+-+-+-+-+-+-+-+-+...-+
```

```
a = 26            (Radius attr for vendor specific)
b = len           (length of the Radius Vendor specific Attribute>
c = 9             (Cisco vendor ID)
d = 251           (Sub attribute ID for Service-Info)
e = len           (length of the vendor specific sub attribute)
f = 'S'           (service-info code for radius server)
g = <ip>;<auth port>;<acct port>;<secret>
```
3.9  Service type code: 251, 'T'
len: 4

```
+-+-+-+-+-+-+-+-+-+-+-+-+
|a|b|    c    |d|e|f|g|
+-+-+-+-+-+-+-+-+-+-+-+-+
```

```
a = 26            (Radius attr for vendor specific)
b = len           (length of the Radius Vendor specific Attribute>
c = 9             (Cisco vendor ID)
d = 251           (Sub attribute ID for Service-Info)
e = len           (length of the vendor specific sub attribute)
f = 'T'           (service-info code for service type)
g = 'X'/'T'/'P'   (Proxy, Tunnel or Passthrough)
```
3.10  Service User Name code: 251, 'U'
len: 4

```
+-+-+-+-+-+-+-+-+-+-+-+-+
|a|b|    c    |d|e|f|g|
+-+-+-+-+-+-+-+-+-+-+-+-+
```

```
a = 26            (Radius attr for vendor specific)
b = len           (length of the Radius Vendor specific Attribute>
c = 9             (Cisco vendor ID)
d = 251           (Sub attribute ID for Service-Info)
e = len           (length of the vendor specific sub attribute)
f = 'U'           (service-info code for service user name)
g = <user name>
Note: Currently, only the Connection Accounting packet uses this
subattribute.
```
3.11  Service Defined Cookie For Proxy Radius code: 251, 'V'
len: >=4

```
+-+-+-+-+-+-+-+-+-+-+-+-+
|a|b|    c    |d|e|f|g|
+-+-+-+-+-+-+-+-+-+-+-+-+
```

```
a = 26            (Radius attr for vendor specific)
b = len           (length of the Radius Vendor specific Attribute>
c = 9             (Cisco vendor ID)
d = 251           (Sub attribute ID for Service-Info)
```

3 Format for Service-Info
Service-Info includes PPP Authentication Type, DNS Server Address, Service Next Hop Gateway, Service Mode, Destination Network, Service Domain, IP Precedence Bits, RADIUS Server, Service Type, Service User Name, Service-Defined Cookie for Proxy RADIUS, and Enable Full Username for Proxy RADIUS.

```
e = len         (length of the vendor specific sub attribute)
f = 'V'         (service-info code for service defined cookie)
g = <service defined cookie>
```

3.12  Enable Full User Name for Proxy Radius

```
code: 251, 'X'
len: 3
```

```
+-+-+-+-+-+-+-+-+-+
|a|b|  c  |d|e|f|
+-+-+-+-+-+-+-+-+-+
```

```
a = 26          (Radius attr for vendor specific)
b = len         (length of the Radius Vendor specific Attribute>
c = 9           (Cisco vendor ID)
d = 251         (Sub attribute ID for Service-Info)
e = len         (length of the vendor specific sub attribute)
f = 'X'         (service-info code for service defined cookie)
```

3.13  Service Authorization

```
code: 251, 'Z'
len: 3
```

```
+-+-+-+-+-+-+-+-+-+
|a|b|  c  |d|e|f|
+-+-+-+-+-+-+-+-+-+
```

```
a = 26          (Radius attr for vendor specific)
b = len         (length of the Radius Vendor specific Attribute>
c = 9           (Cisco vendor ID)
d = 251         (Sub attribute ID for Service-Info)
e = len         (length of the vendor specific sub attribute)
f = 'Z'         (service-info code for service authorization required)
```

4 Format for Command-Code
Command-Code includes Account Logon, Account Logoff, Account Ping, Get Account Token, Set Account Token, Service Logon, Service Logoff, Default DNS Service, Service Message, and Error Message Code.

4.1  Account Logon

```
code: 252, 1
len: >4
```

```
+-+-+-+-+-+-+-+-+-+-+-+-+...-+-+
|a|b|  c  |d|e|f|    g     |
+-+-+-+-+-+-+-+-+-+-+-+-+...-+-+
```

```
a = 26          (Radius attr for vendor specific)
b = len         (length of the Radius Vendor specific Attribute>
c = 9           (Cisco vendor ID)
d = 252         (Sub attribute ID for Command-code)
e = len         (length of the vendor specific sub attribute)
f = 1           (Command-code for account log on)
g = <account name>
```

4.2  Account Logoff

```
code: 252, 2
len: >4
```

```
+-+-+-+-+-+-+-+-+-+-+-+-+...-+-+
|a|b|  c  |d|e|f|    g     |
+-+-+-+-+-+-+-+-+-+-+-+-+...-+-+
```

4 Format for Command-Code
Command-Code includes Account Logon, Account Logoff, Account Ping, Get Account Token, Set Account Token, Service Logon, Service Logoff, Default DNS Service, Service Message, and Error Message Code.

```
a = 26          (Radius attr for vendor specific)
b = len         (length of the Radius Vendor specific Attribute>
c = 9           (Cisco vendor ID)
d = 252         (Sub attribute ID for Command-code)
e = len         (length of the vendor specific sub attribute)
f = 2           (Command-code for account log off)
g = <account name>
```

4.3  Account Ping

```
code: 252, 4
len: >3
```

```
+-+-+-+-+-+-+-+-+-+-+-+-+...-+-+
|a|b|  c  |d|e|f|    g     |
+-+-+-+-+-+-+-+-+-+-+-+-+...-+-+
```

```
a = 26          (Radius attr for vendor specific)
b = len         (length of the Radius Vendor specific Attribute>
c = 9           (Cisco vendor ID)
d = 252         (Sub attribute ID for Command-code)
e = len         (length of the vendor specific sub attribute)
f = 4           (Command-code for account ping)
for Access-Request:
g = " " (query for account) or <servicename> (query for service)
for Access-Accept:
g = "0" (account not logged on)
or "1" (account logged on)
or "0<service>" (service not logged on)
or "1<service>" (service logged on)
Note: when g =="1", a list of services (code: 250, 'N') will follow.
The first byte after 'N' will be '1' indicating an active service, or '0'
indicating an inactive service.
```

4.4  Get Account Token (uncommitted)

```
code: 252, 17
len: >4
```

```
+-+-+-+-+-+-+-+-+-+-+-+-+...-+-+
|a|b|  c  |d|e|f|    g     |
+-+-+-+-+-+-+-+-+-+-+-+-+...-+-+
```

```
a = 26          (Radius attr for vendor specific)
b = len         (length of the Radius Vendor specific Attribute>
c = 9           (Cisco vendor ID)
d = 252         (Sub attribute ID for Command-code)
e = len         (length of the vendor specific sub attribute)
f = 17          (Command-code for get account token)
g = <token>
```

4.5  Set Account Token (uncommitted)

```
code: 252, 18
len: >4
```

```
+-+-+-+-+-+-+-+-+-+-+-+-+...-+-+
|a|b|  c  |d|e|f|    g     |
+-+-+-+-+-+-+-+-+-+-+-+-+...-+-+
```

```
a = 26          (Radius attr for vendor specific)
b = len         (length of the Radius Vendor specific Attribute>
c = 9           (Cisco vendor ID)
d = 252         (Sub attribute ID for Command-code)
e = len         (length of the vendor specific sub attribute)
f = 18          (Command-code for Set Account Token)
g = <token>
```

| 4 Format for Command-Code |
|---|
| Command-Code includes Account Logon, Account Logoff, Account Ping, Get Account Token, Set Account Token, Service Logon, Service Logoff, Default DNS Service, Service Message, and Error Message Code. |

4.6  Service Logon code: 252, 11
len: >4

```
+-+-+-+-+-+-+-+-+-+-+-+-+...-+-+
|a|b|   c   |d|e|f|    g      |
+-+-+-+-+-+-+-+-+-+-+-+-+...-+-+
``` a = 26          (Radius attr for vendor specific)
b = len         (length of the Radius Vendor specific Attribute>
c = 9           (Cisco vendor ID)
d = 252         (Sub attribute ID for Command-code)
e = len         (length of the vendor specific sub attribute)
f = 11          (Command-code for service log on)
g = <service name>

4.7  Service Logoff code: 252, 12
len: >4

```
+-+-+-+-+-+-+-+-+-+-+-+-+...-+-+
|a|b|   c   |d|e|f|    g      |
+-+-+-+-+-+-+-+-+-+-+-+-+...-+-+
``` a = 26          (Radius attr for vendor specific)
b = len         (length of the Radius Vendor specific Attribute>
c = 9           (Cisco vendor ID)
d = 252         (Sub attribute ID for Command-code)
e = Len         (length of the vendor specific sub attribute)
f = 12          (Command-code for service log off)
g = <service name>

4.8  Default DNS Service code: 252, 14
len: >4

```
+-+-+-+-+-+-+-+-+-+-+-+-+...-+-+
|a|b|   c   |d|e|f|    g      |
+-+-+-+-+-+-+-+-+-+-+-+-+...-+-+
``` a = 26          (Radius attr for vendor specific)
b = len         (length of the Radius Vendor specific Attribute>
c = 9           (Cisco vendor ID)
d = 252         (Sub attribute ID for Command-code)
e = len         (length of the vendor specific sub attribute)
f = 14          (Command-code for Default DNS Service)
g = <service name>
Note: This subattribute can be sent from the SSD to the SSG to specify the default DNS service. Currently, not used.

4.9  Service Message code: 252, 15
len: >4

```
+-+-+-+-+-+-+-+-+-+-+-+-+...-+-+
|a|b|   c   |d|e|f|    g      |
+-+-+-+-+-+-+-+-+-+-+-+-+...-+-+
``` a = 26          (Radius attr for vendor specific)
b = len         (length of the Radius Vendor specific Attribute>
c = 9           (Cisco vendor ID)
d = 252         (Sub attribute ID for Command-code)
e = len         (length of the vendor specific sub attribute)
f = 15          (Command-code for service message)
g = <message>

4.10  Error Message Code code: 252, 16
len: >4

```
+-+-+-+-+-+-+-+-+-+-+-+-+
|a|b|   c   |d|e|f|  g  |
+-+-+-+-+-+-+-+-+-+-+-+-+
``` a = 26          (Radius attr for vendor specific)
b = len         (length of the Radius Vendor specific Attribute>
c = 9           (Cisco vendor ID)
d = 252         (Sub attribute ID for Command-code)
e = len         (length of the vendor specific sub attribute)
f = 16          (Command-code for error code)
g = <errorCode;[arg1;arg2;...]>

| 5 Format for Control-Info |
|---|
| Control-Info includes Filter, Source and Destination Filters, Next Hop Gateway Table Entry, Input Bytes Count, and Output Bytes Count. |

5.1  Filter (port filtering)

code: 253, 'F'
len: >12

```
+-+-+-+-+-+-+-+-+-+-+-+...-+
|a|b|   c   |d|e|f|p|  g   |
+-+-+-+-+-+-+-+-+-+-+-+...-+
``` a = 26          (Radius attribute for vendor specific)
b = len         (length of the Radius vendor-specific)
c = 9           (Cisco vendor ID)
d = 253         (sub-attribute ID for Service-Info)
e = len         (length of the vendor-specific filter)
p = 'F'         (Port filter indication flag)
g = <ip:portlist;mask;flag;filterID>
Note: The portlist variable can be a list of port numbers delimited by commas (,).
A hyphen (-) can be used to specify a range. For example, if a port list consists of 23, 34, 35, and all ports that are greater than 3000, the ports can be specified as 23,34-35,3001-.

5.2  Both Source and Destination Filters (port filtering)

code: 253, 'F'
len: >12

```
+-+-+-+-+-+-+-+-+-+-+-+...-+-+...-+
|a|b|   c   |d|e|f|p|  g   |  h   |
+-+-+-+-+-+-+-+-+-+-+-+...-+-+...-+
``` a = 26          (Radius attribute for vendor specific)
b = len         (length of the Radius vendor-specific)
c = 9           (Cisco vendor ID)
d = 253         (sub-attribute ID for Service-Info)
e = len         (length of the vendor-specific filter)
p = 'F'         (Port filter indication flag)
g = <src ip:src portlist;mask;>
h = <dst ip:dst portlist;mask;flag;filterID>
Note: The portlist variable can be a list of port numbers delimited by commas (,).
A hyphen (-) can be used to specify a range. For example, if a port list consists of 23, 34, 35, and all ports that are greater than 3000, the ports can be specified as 23,34-35,3001-.
The flag is either 'D' for deny or 'P' for permit.

-continued

5   Format for Control-Info
Control-Info includes Filter, Source and Destination Filters, Next Hop Gateway Table Entry, Input Bytes Count, and Output Bytes Count.

5.3   Next Hop Gateway Table Entry code: 253, 'G'
len: >12

```
+-+-+-+-+-+-+-+-+-+-+-+...-+
|a|b|  c  |d|e|f|p|   g    |
+-+-+-+-+-+-+-+-+-+-+-+...-+
``` a = 26   (Radius attribute for vendor specific)
b = len  (length of the Radius vendor-specific)
c = 9    (Cisco vendor ID)
d = 253  (sub-attribute ID for Service-Info)
e = len  (length of the vendor-specific filter)
p = 'G'  (Next Hop Gateway Entry Flag)
g = <key;ip> (key can be any string; ip is the corresponding next hop gateway ip)
Note: Multiple entries can be defined to create a Next Hop Gateway Table. Each SSG can have a Next Hop Gateway Table defined, and each service can reference entries in this table by using the Service-Info Next Hop Gateway attribute.

5.4   Input Bytes Count code: 253, 'I'
len: >12

```
+-+-+-+-+-+-+-+-+-+-+-+...-+
|a|b|  c  |d|e|f|p|   g    |
+-+-+-+-+-+-+-+-+-+-+-+...-+
``` a = 26   (Radius attribute for vendor specific)
b = len  (length of the Radius vendor-specific)
c = 9    (Cisco vendor ID)
d = 253  (sub-attribute ID for Service-Info)
e = len  (length of the vendor-specific filter)
p = 'I'  (Input Bytes Count Flag)
g = <HI;LOW> (Formula to calculate exact byte count is HI*4294967296 + LOW)
Note: This attribute is for accounting packets only.

5.5   Output Bytes Count code: 253, 'O'
len: >12

```
+-+-+-+-+-+-+-+-+-+-+-+...-+
|a|b|  c  |d|e|f|p|   g    |
+-+-+-+-+-+-+-+-+-+-+-+...-+
``` a = 26   (Radius attribute for vendor specific)
b = len  (length of the Radius vendor-specific)
c = 9    (Cisco vendor ID)
d = 253  (sub-attribute ID for Service-Info)
e = len  (length of the vendor-specific filter)
p = 'O'  (Output Bytes Count Flag)
g = <HI;LOW> (Formula to calculate exact byte count is HI*4294967296 + LOW)
Note: This attribute is for accounting packets only.

5.6   Prepaid Quota code: 253, 'Q'
len: >12

```
+-+-+-+-+-+-+-+-+-+-+-+...-+
|a|b|  c  |d|e|f|g|   h    |
+-+-+-+-+-+-+-+-+-+-+-+...-+
``` a = 26   (Radius attribute for vendor specific)
b = len  (length of the Radius vendor-specific)
c = 9    (Cisco vendor ID)
d = 253  (sub-attribute ID for Control-Info)
e = len  (length of the vendor-specific filter)

-continued

5   Format for Control-Info
Control-Info includes Filter, Source and Destination Filters, Next Hop Gateway Table Entry, Input Bytes Count, and Output Bytes Count.

f = 'Q'   (control-info code for prepaid Quota)
g = <'T'/'V'> (Quota sub-code for 'T'ime or 'V'olume)
h = <value> (ASCII numeric string representing the quota value)

What is claimed is:

1. A method implemented by a service selection gateway for authorizing prepaid mobile network services, the method comprising the steps of:
   receiving from a GPRS Gateway Support Node (GGSN) a first request to authenticate a mobile station for activating the mobile station's Packet Data Protocol (PDP) context;
   forwarding to an authentication server the request to authenticate the mobile station;
   receiving a first response to the request from the authentication server;
   in response to receiving the first response, preparing and sending a second response to the GGSN, wherein the second response comprises a set of attributes identified in the first request from the GGSN;
   receiving a second request for a prepaid network service from the mobile station;
   requesting the authentication server to provide a prepaid quota value associated with the prepaid network service and the mobile station;
   receiving the prepaid quota value from the authentication server;
   forwarding network traffic associated with the prepaid network service from the mobile station to a service provider only when the prepaid quota value is nonzero;
   monitoring traffic communicated by the mobile station for the prepaid network service associated with the quota value;
   determining that the traffic is discontinued or inactive;
   returning an unused portion of the quota value to the authentication server;
   allowing the mobile station to concurrently access a plurality of different services using the mobile station's PDP; and
   allotting the unused portion of the quota value to a plurality of different concurrent connections of the mobile station that are respectively associated with the plurality of different services concurrently accessed by the mobile station;
   wherein a router performs all the preceding steps.

2. A method as recited in claim 1, wherein the authentication server is an authorization, authentication and accounting (AAA) server; and
   wherein the first response comprises a service profile for the mobile user, which service profile indicates whether service authorization is required for the prepaid network service.

3. A method as recited in claim 1 further comprising the steps of:
   determining that the prepaid quota value is approximately zero as a result of usage of the prepaid network service by the mobile user;
   requesting the authentication server to re-authorize usage of the prepaid network service; and determining that the mobile user is authorized to continue accessing the prepaid network service only when the authentication server re-authorizes usage of the prepaid network service.

4. A method as recited in claim 3, further comprising the step of redirecting the traffic of the mobile station associated with the prepaid network service to a portal page that facilitates replenishment of the prepaid network service quota value when the authentication server fails to re-authorize usage of the prepaid network service.

5. A method as recited in claim 1, further comprising the steps of:
creating and storing a PDP context data structure in association with the mobile station;
requesting the authentication server to provide a service profile associated with the mobile user; and
performing the determining step for each service that is identified in the service profile.

6. A method as recited in claim 1 further comprising the steps of:
receiving, from the authentication server, a new portion of the quota value in association with authorization for a new connection of the mobile station for use with a new prepaid network service.

7. A method as recited in claim 6, wherein receiving a new portion of the quota value further comprises placing the connection in a waiting state, determining that the mobile station has re-initiated communication of traffic on the connection, and receiving, from the authentication server, a new portion of the quota value in association with authorization for the connection.

8. A method as recited in claim 1, wherein the determining step further comprises the steps of:
sending an authorization request to the authentication server;
redirecting network traffic associated with the prepaid network service to a portal page that provides user credit status and information about replenishing the quota value; and
maintaining a connection of the mobile station to the prepaid network service while concurrently blocking traffic directed to the prepaid network service.

9. A method as recited in claim 8, further comprising the steps of:
receiving a message from the authentication server specifying re-authorization for the connection; and
performing the steps of claim 1 with respect to monitoring, determining, returning and allotting.

10. A volatile or non-volatile computer-readable medium carrying one or more sequences of instructions for authorizing prepaid mobile network services, which instructions, when executed by one or more processors, cause the one or more processors to carry out the steps of:
receiving from a GPRS Gateway Support Node (GGSN) a first request to authenticate a mobile station for activating the mobile station's Packet Data Protocol (PDP) context;
forwarding to an authentication server the request to authenticate the mobile station;
receiving a first response to the request from the authentication server;
in response to receiving the first response, preparing and sending a second response to the GGSN, wherein the second response comprises a set of attributes identified in the first request from the GGSN;
receiving a second request for a prepaid network service from a mobile station;
requesting the authentication server to provide a prepaid quota value associated with the prepaid network service and the mobile station;
receiving the prepaid quota value from the authentication server;
forwarding network traffic associated with the prepaid network service from the mobile station to a service provider only when the prepaid quota value is nonzero;
monitoring traffic communicated by the mobile station for the prepaid network service associated with the quota value;
determining that the traffic is discontinued or inactive;
returning an unused portion of the quota value to the authentication server;
allowing the mobile station to concurrently access a plurality of different services using the mobile station's PDP; and
allotting the unused portion of the quota value to a plurality of different concurrent connections of the mobile station that are respectively associated with a plurality of different services concurrently accessed by the mobile station;
wherein a router performs all the preceding steps.

11. An apparatus for authorizing prepaid mobile network services, comprising:
a network interface that is coupled to the data network for receiving one or more packet flows therefrom;
a processor;
one or more stored sequences of instructions which, when executed by the processor, cause the processor to carry out the steps of:
receiving from a GPRS Gateway Support Node (GGSN) a first request to authenticate a mobile station for activating the mobile station's Packet Data Protocol (PDP) context;
forwarding to an authentication server the request to authenticate the mobile station;
receiving a first response to the request from the authentication server;
in response to receiving the first response, preparing and sending a second response to the GGSN, wherein the second response comprises a set of attributes identified in the first request from the GGSN;
receiving a second request for a prepaid network service from a mobile station;
requesting the authentication server to provide a prepaid quota value associated with the prepaid network service and the mobile station;
receiving the prepaid quota value from the authentication server;
forwarding network traffic associated with the prepaid network service from the mobile station to a service provider only when the prepaid quota value is nonzero;
monitoring traffic communicated by the mobile station for the prepaid network service associated with the quota value;
determining that the traffic is discontinued or inactive;
returning an unused portion of the quota value to the authentication server;
allowing the mobile station to concurrently access a plurality of different services using the mobile station's PDP; and
allotting the unused portion of the quota value to a plurality of different concurrent connections of the mobile station that are respectively associated with a plurality of different services concurrently accessed by the mobile station;

wherein the apparatus is a router.

12. An apparatus as recited in claim 11, wherein the authentication server is an authorization, authentication and accounting (AAA) server;
   wherein the first response comprises a service profile for the mobile user, which service profile indicates whether service authorization is required for the prepaid network service.

13. An apparatus as recited in claim 11 further comprising instructions which, when executed by the processor, cause the processor to carry out the steps of:
   determining that the prepaid quota value is approximately zero as a result of usage of the prepaid network service by the mobile user;
   requesting the authentication server to re-authorize usage of the prepaid network service; and
   determining that the mobile user is authorized to continue accessing the prepaid network service only when the authentication server re-authorizes usage of the prepaid network service.

14. An apparatus as recited in claim 13, further comprising instructions which, when executed by the processor, cause the processor to carry out the step of redirecting the traffic of the mobile station associated with the prepaid network service to a portal page that facilitates replenishment of the prepaid network service quota value when the authentication server fails to re-authorize usage of the prepaid network service.

15. An apparatus as recited in claim 11, further comprising instructions which, when executed by the processor, cause the processor to carry out the steps of:
   creating and storing a PDP context data structure in association with the mobile station;
   requesting the authentication server to provide a service profile associated with the mobile user; and
   performing the determining step for each service that is identified in the service profile.

16. An apparatus as recited in claim 11 further comprising instructions which, when executed by the processor, cause the processor to carry out the steps of:
   receiving, from the authentication server, a new portion of the quota value in association with authorization for a new connection of the mobile station for use with a new prepaid network service.

17. An apparatus as recited in claim 16, wherein receiving a new portion of the quota value further comprises placing the connection in a waiting state, determining that the mobile station has re-initiated communication of traffic on the connection, and receiving, from the authentication server, a new portion of the quota value in association with authorization for the connection.

18. An apparatus as recited in claim 11, wherein the determining step further comprises the steps of:
   sending an authorization request to the authentication server;
   redirecting network traffic associated with the prepaid network service to a portal page that provides user credit status and information about replenishing the quota value; and
   maintaining a connection of the mobile station to the prepaid network service while concurrently blocking traffic directed to the prepaid network service.

19. An apparatus as recited in claim 18, further comprising instructions which, when executed by the processor, cause the processor to carry out the steps of:
   receiving a message from the authentication server specifying re-authorization for the connection; and
   performing the steps of claim 18 with respect to monitoring, determining, returning and allotting.

20. A method implemented by a service selection gateway for authorizing prepaid mobile network services, the method comprising the steps of:
   receiving from a GPRS Gateway Support Node (GGSN) a first request to authenticate a mobile station for activating the mobile station's Packet Data Protocol (PDP) context;
   forwarding to an authentication server the request to authenticate the mobile station;
   receiving a first response to the request from the authentication server;
   in response to receiving the first response, preparing and sending a second response to the GGSN, wherein the second response comprises a set of attributes identified in the first request from the GGSN;
   receiving from the mobile station a second request for a prepaid network service;
   authorizing the second request for the prepaid network service;
   forwarding network traffic associated with the prepaid network service from the mobile station to a service provider;
   monitoring traffic communicated by the mobile station for the prepaid network service; and
   allowing the mobile station to concurrently access a plurality of different services using the mobile station's PDP;
   wherein a router performs all the preceding steps.

21. A method as recited in claim 20,
   wherein the authentication server is an authorization, authentication and accounting (AAA) server;
   wherein the first response comprises a service profile for the mobile user, which service profile indicates whether service authorization is required for the prepaid network service.

22. A method as recited in claim 20, further comprising:
   creating and storing a PDP context data structure in association with the mobile station;
   requesting the authentication server to provide a service profile associated with the mobile user; and
   performing the determining step for each service that is identified in the service profile.

23. A method as recited in claim 20, wherein the determining step further comprises the steps of:
   sending an authorization request to the authentication server;
   redirecting network traffic associated with the prepaid network service to a portal page that provides user credit status and information about replenishing the quota value; and
   maintaining a connection of the mobile station to the prepaid network service while concurrently blocking traffic directed to the prepaid network service.

24. A method as recited in claim 23, further comprising:
   receiving a message from the authentication server specifying re-authorization for the connection; and
   monitoring traffic communicated by the mobile station for the prepaid network service.

25. A volatile or non-volatile computer-readable medium carrying one or more sequences of instructions for authorizing prepaid mobile network services, which instructions, when executed by one or more processors, cause the one or more processors to carry out the steps of:

receiving from a GPRS Gateway Support Node (GGSN) a first request to authenticate a mobile station for activating the mobile station's Packet Data Protocol (PDP) context;

forwarding to an authentication server the request to authenticate the mobile station;

receiving a first response to the request from the authentication server;

in response to receiving the first response, preparing and sending a second response to the GGSN, wherein the second response comprises a set of attributes identified in the first request from the GGSN;

receiving from the mobile station a second request for a prepaid network service;

authorizing the second request for the prepaid network service;

forwarding network traffic associated with the prepaid network service from the mobile station to a service provider;

monitoring traffic communicated by the mobile station for the prepaid network service; and allowing the mobile station to concurrently access a plurality of different services using the mobile station's PDP;

wherein a router performs all the preceding steps.

26. An apparatus for authorizing prepaid mobile network services, comprising:

a network interface that is coupled to the data network for receiving one or more packet flows therefrom;

a processor;

one or more stored sequences of instructions which, when executed by the processor, cause the processor to carry out the steps of:

receiving from a GPRS Gateway Support Node (GGSN) a first request to authenticate a mobile station for activating the mobile station's Packet Data Protocol (PDP) context;

forwarding to an authentication server the request to authenticate the mobile station;

receiving a first response to the request from the authentication server;

in response to receiving the first response, preparing and sending a second response to the GGSN, wherein the second response comprises a set of attributes identified in the first request from the GGSN;

receiving from the mobile station a second request for a prepaid network service;

authorizing the second request for the prepaid network service;

forwarding network traffic associated with the prepaid network service from the mobile station to a service provider;

monitoring traffic communicated by the mobile station for the prepaid network service; and allowing the mobile station to concurrently access a plurality of different services using the mobile station's PDP;

wherein the apparatus is a router.

27. An apparatus as recited in claim 26, wherein the authentication server is an authorization, authentication and accounting (AAA) server;

wherein the first response comprises a service profile for the mobile user, which service profile indicates whether service authorization is required for the prepaid network service.

28. An apparatus as recited in claim 26, further comprising instructions which, when executed by the processor, cause the processor to carry out the steps of:

creating and storing a PDP context data structure in association with the mobile station;

requesting the authentication server to provide a service profile associated with the mobile user; and performing the determining step for each service that is identified in the service profile.

29. An apparatus as recited in claim 26, wherein the determining step further comprises the steps of:

sending an authorization request to the authentication server;

redirecting network traffic associated with the prepaid network service to a portal page that provides user credit status and information about replenishing the quota value; and maintaining a connection of the mobile station to the prepaid network service while concurrently blocking traffic directed to the prepaid network service.

30. An apparatus as recited in claim 29, further comprising instructions which, when executed by the processor, cause the processor to carry out the steps of:

receiving a message from the authentication server specifying re-authorization for the connection; and monitoring traffic communicated by the mobile station for the prepaid network service.

* * * * *